(12) United States Patent
Kikuchi et al.

(10) Patent No.: US 7,448,304 B2
(45) Date of Patent: Nov. 11, 2008

(54) LATHE

(75) Inventors: Yoshiharu Kikuchi, Niigata (JP);
Shinsuke Kumakura, Niigata (JP);
Hidenori Sato, Niigata (JP)

(73) Assignee: Tsugami Corporation, Tokyo (JP)

( * ) Notice: Subject to any disclaimer, the term of this patent is extended or adjusted under 35 U.S.C. 154(b) by 298 days.

(21) Appl. No.: 10/956,208

(22) Filed: Sep. 30, 2004

(65) Prior Publication Data

US 2005/0076757 A1   Apr. 14, 2005

(30) Foreign Application Priority Data

Oct. 3, 2003   (JP)   ............... 2003-346249
Jul. 28, 2004   (JP)   ............... 2004-219722

(51) Int. Cl.
*B23B 13/00* (2006.01)
*B23Q 3/155* (2006.01)

(52) U.S. Cl. ............... 82/124; 82/149; 82/125; 82/121

(58) Field of Classification Search .......... 82/121, 82/122, 123, 124, 129, 149, 125
See application file for complete search history.

(56) References Cited

U.S. PATENT DOCUMENTS

| | | | | |
|---|---|---|---|---|
| 3,926,078 A | * | 12/1975 | Ishizuka et al. | 82/124 |
| 4,457,193 A | * | 7/1984 | Matthey | 82/129 |
| 4,612,832 A | * | 9/1986 | Ushigoe et al. | 82/129 |
| 4,654,955 A | * | 4/1987 | Mathie | 483/19 |
| 4,763,549 A | * | 8/1988 | Hata et al. | 82/124 |
| 5,083,485 A | * | 1/1992 | Link et al. | 82/124 |
| 5,153,973 A | * | 10/1992 | Kitamura | 29/33 P |
| 5,175,914 A | * | 1/1993 | Mitsukuchi et al. | 29/27 C |
| 5,214,829 A | * | 6/1993 | Minagawa | 29/27 C |
| 5,289,622 A | * | 3/1994 | Minagawa | 29/27 R |
| 5,392,501 A | * | 2/1995 | Sonnek | 29/27 C |
| 5,417,130 A | * | 5/1995 | Dorsch | 82/1.11 |
| 5,421,229 A | | 6/1995 | Grossmann et al. | |

(Continued)

FOREIGN PATENT DOCUMENTS

DE   19621406 A1   4/1997

(Continued)

OTHER PUBLICATIONS

Office Action of Jun. 12, 2007 in related Japanese application 2004-234476 and English translation of same.

*Primary Examiner*—Willmon Fridie
(74) *Attorney, Agent, or Firm*—Townsend and Townsend and Crew LLP

(57) ABSTRACT

A main spindle and a back spindle grip works W, respectively. Or, the main spindle grips one end of a work W and the back spindle grips the other end of the work W. A tool is attached to a tool spindle. By adjusting the positions of the spindles and the position of the tool spindle, the work W gripped by the main spindle and the back spindle is machined by the tool. Since tool spindle can change the direction of the tool, the work W, including both ends thereof, can be entirely machined into a complex shape. A guide bush supports the work W to prevent the work W from being bent when a lengthy work W is machined. Therefore, this lathe can entirely machine a long or short work into a complex shape.

6 Claims, 36 Drawing Sheets

U.S. PATENT DOCUMENTS

| | | | |
|---|---|---|---|
| 5,751,586 A * | 5/1998 | Grabovac | 700/169 |
| 5,885,199 A * | 3/1999 | Shao | 483/19 |
| 6,128,812 A * | 10/2000 | Link et al. | 29/40 |
| 6,185,818 B1 * | 2/2001 | Ito et al. | 29/889.7 |
| 6,651,535 B2 * | 11/2003 | Hafla et al. | 82/121 |
| D489,077 S * | 4/2004 | Bloch | D15/127 |
| 6,722,236 B1 * | 4/2004 | Baldini et al. | 82/117 |
| 6,758,117 B2 * | 7/2004 | Baumann et al. | 82/117 |
| D496,947 S * | 10/2004 | Baulk | D15/130 |
| 7,039,992 B2 * | 5/2006 | Tokuma et al. | 29/27 C |
| 7,043,805 B2 * | 5/2006 | Tokuma et al. | 29/27 C |

FOREIGN PATENT DOCUMENTS

| | | | |
|---|---|---|---|
| DE | 10213778 A1 | 2/2003 | |
| EP | 090627 A | 10/1999 | |
| JP | 4-29482 B2 | 5/1992 | |
| JP | 05-092301 | 4/1993 | |
| JP | 06-304801 A | 11/1994 | |
| JP | 10015703 | 1/1998 | |
| JP | 11-138374 | 5/1999 | |
| JP | 11138374 A | 5/1999 | |
| JP | 2000-042853 A | 2/2000 | |
| JP | 2002-239806 | 8/2002 | |
| JP | 2003-117701 | 4/2003 | |
| JP | 2003117701 A | 4/2003 | |
| JP | 2003-225801 A | 8/2003 | |

* cited by examiner

EXAMPLE2

EXAMPLE5

EXAMPLE6

EXAMPLE 8

EXAMPLE 9

FIG. 15 EXAMPLE 11

EXAMPLE 14

EXAMPLE15

EXAMPLE 16

EXAMPLE17

EXAMPLE 18

EXAMPLE19

EXAMPLE20

EXAMPLE 21

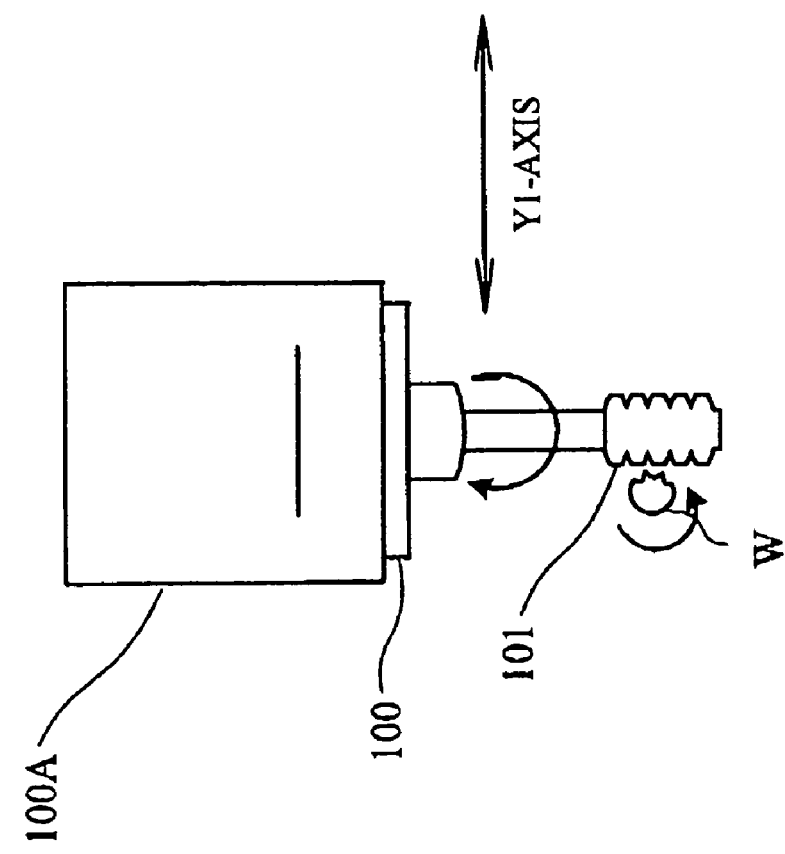
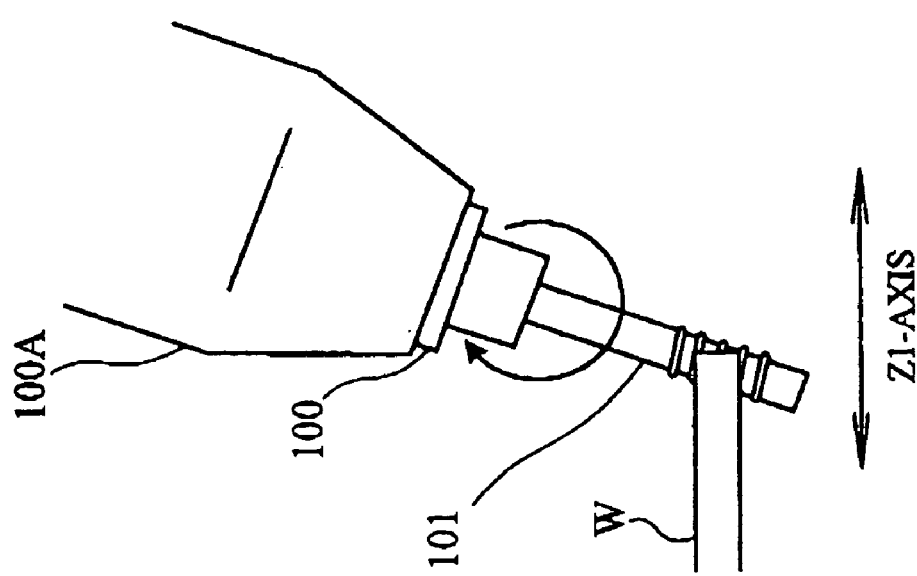
FIG.30B
FIG.30A
EXAMPLE 22

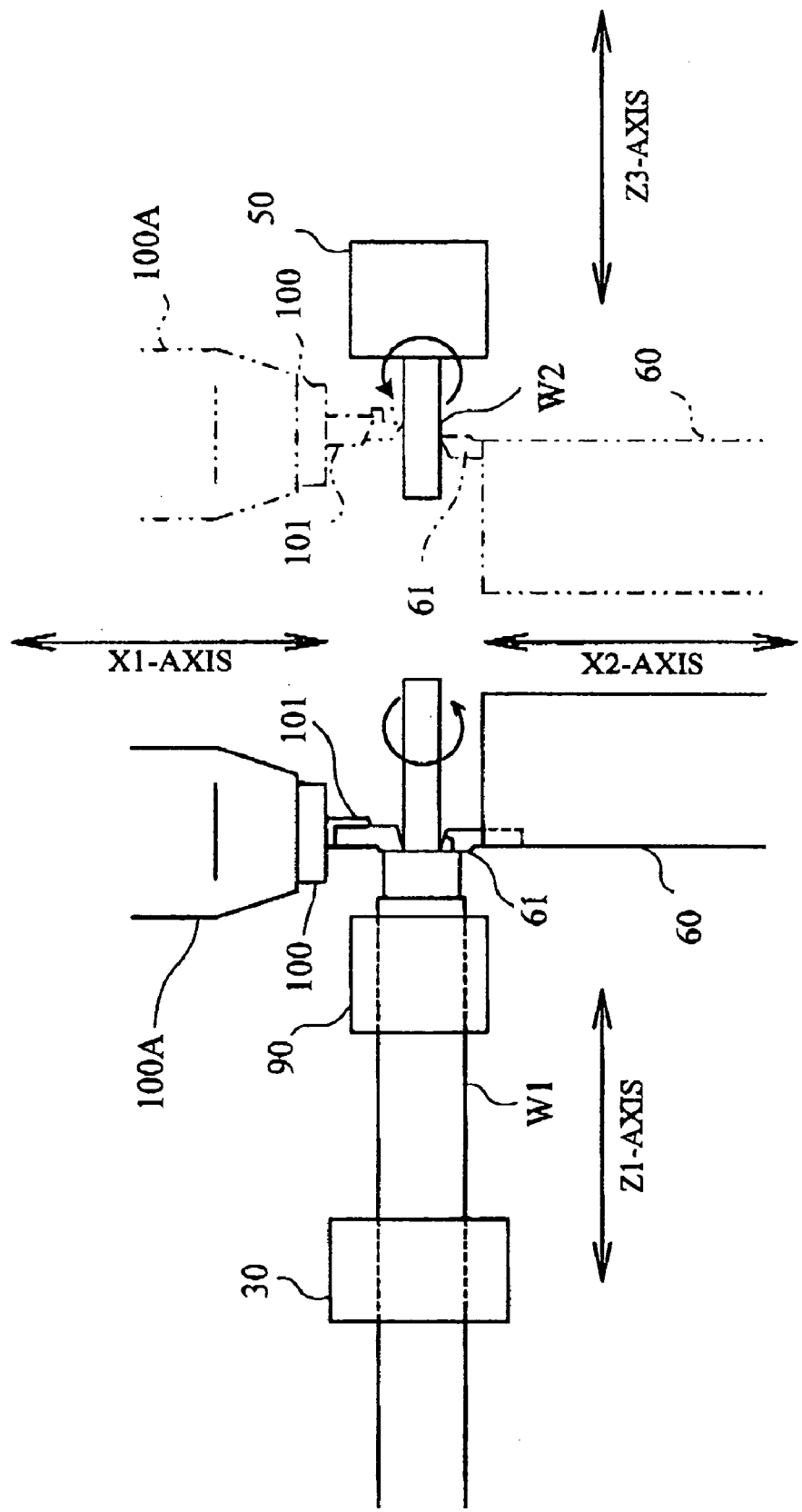
FIG. 31 EXAMPLE23

EXAMPLE24

FIG.33 EXAMPLE25

EXAMPLE26

EXAMPLE27

EXAMPLE28

LATHE

CROSS-REFERENCES TO RELATED APPLICATIONS

This application claims priority to Japanese Patent Application No. 2003-346249 filed on Oct. 3, 2003, and Japanese Patent Application No. 2004-219722 filed on Jul. 28, 2004, and is incorporated herein by reference.

BACKGROUND OF THE INVENTION

1. Field of the Invention

The present invention relates to a lathe.

2. Description of the Related Art

A lathe that machines a work in combined manners is called combined-machining lathe. A combined-machining lathe is disclosed in, for example, Unexamined Japanese Patent Application KOKAI Publication No. H11-138374, and Unexamined Japanese Patent Application KOKAI Publication No. 2003-117701.

The lathe disclosed in Unexamined Japanese Patent Application KOKAI Publication No. H11-138374 is a combined-machining lathe whose main spindle is fixed. This combined-machining lathe has a main spindle for gripping a work, a tailstock, a reciprocating carriage, and a tool spindle. The tailstock is arranged at a position opposite to the main spindle. The reciprocating carriage is a carriage that reciprocates in parallel with the centerline of the main spindle or of the tailstock. The tool spindle is fixed on the reciprocating carriage. The tool spindle grips a tool. The tool spindle can change the direction of the tool. A work that is gripped by the main spindle or the tailstock is machined by the tool.

When a lengthy work is machined by a combined-machining lathe having such a configuration as described above, the work extends from the main spindle with its one end gripped by the main spindle. Due to this, the work is pushed by the tool and bent. Precise machining cannot be applied if the work remains bent. Therefore, for machining a lengthy work, it is necessary to attach to the tailstock, a center that would abut on the end surface of the work to support the work in cooperation with the main spindle.

However, the following problems arise when a center is attached to the tailstock, (1) Since the center is applied to the end surface of the work, the end surface (front surface) of the work cannot be machined.

(2) Since the center is attached to the tailstock, a chuck for gripping the work cannot be attached to the tailstock. Therefore, it is impossible to machine the back end surface (back surface) of the work with the work gripped by a chuck at the tailstock.

(3) Since there is a fear of the tool and the tailstock interfering with each other (colliding on each other), a portion of the work that is held close to the tailstock cannot be machined.

As described, with a lathe whose main spindle is fixed, it has been difficult to machine a lengthy work in combined manners.

Further, with the combined-machining lathe disclosed in the Unexamined Japanese Patent Application KOKAI Publication No. H11-138374, length of work that can be machined is restricted depending on the distance between the main spindle and the tailstock. Therefore, a work having a length equal to or larger than the distance between the main spindle and the tailstock cannot be machined.

On the other hand, a method of machining a lengthy work without using a tailstock is disclosed in the Unexamined Japanese Patent Application KOKAI Publication No. 2003-117701. Unexamined Japanese Patent Application KOKAI Publication No. 2003-117701 discloses a technique for providing a guide bush for preventing bending of the work adjacently to the tool, and machining the lengthy work by moving the main spindle.

The lathe disclosed in Unexamined Japanese Patent Application KOKAI Publication No. 2003-117701 has a first headstock for rotatably gripping a work, a second headstock and front tool rest which are arranged on a back headstock, a guide bush, a tool rest to which a bite for cutting a work is attached, a third headstock, a tool attached to the third hardstock for machining the back surface of a work, and a rotatable tool carriage which is movable perpendicularly to the axial direction of a work.

The back headstock has a function for moving in the direction of axis of a work which is gripped by the first headstock, and a function for moving perpendicularly to this axial direction. The guide bush supports the work which is rotating. The second headstock grips the end surface (front surface) of the work. A drill for machining the front surface of the work is attached to the tool rest. The third headstock is arranged at a side of the guide bush.

According to the lathe disclosed in Unexamined Japanese Patent Application KOKAI Publication No. 2003-117701, the front end (front surface) of a work is machined by a tool attached to the front tool rest while the work is gripped by the first headstock and further supported by the guide bush. After this, the back headstock is moved, so that the front end surface of the work is gripped by the second headstock and then the work gripped by the second headstock is gripped by the third headstock. Sequentially, the front end of the work gripped by the third headstock is machined by the tool attached to the tool rest.

In a case where the back end (back surface) of the work is machined by this lathe, the back headstock is moved, so that the back end (back surface) of the work gripped by the second headstock is machined by a drill attached to the third headstock.

The lathe disclosed in Unexamined Japanese Patent Application KOKAI Publication No. 2003-117701 can machine the front end and back end of a lengthy work, but has the following problems.

(1) In order to form an angled hole in the work, it is necessary to attach an angled hole forming attachment to the tool rest.

(2) It is necessary to separately prepare a tool for machining the front end surface of the work and a tool for machining the back end surface thereof.

(3) When positioning a tool on the tool rest, it is necessary to consider a fear that the tool might interfere with (collide on) an adjacent tool.

(4) It is necessary to secure in the lathe, a place where the tool for machining the back end surface of the work is attached, in addition to a place where the tool for machining the front end surface of the work is attached. This makes it difficult to downsize the lathe and also deteriorates the working efficiency.

(5) The number of tools that can be attached to the tool rest and the third headstock is limited. This limits the kinds of works that can be machined in a complex manner without changing tools.

(6) It is necessary to stop the lathe when changing tools, making the working efficiency worse.

BRIEF SUMMARY OF THE INVENTION

The present invention was made in view of the above-described circumstances, and an object of the present invention is to provide a lathe that can efficiently machine works of varied lengths from short length to long length.

Another object of the present invention is to provide a lathe that can machine a work without excluding both end surfaces thereof, into a complex shape.

Still another object of the present invention is to provide a lathe that can machine works varied in length, entirely without excluding both end surfaces thereof, into complex shapes.

To achieve the above objects, a lathe according to a first aspect of the present invention comprises:

a main spindle which grips and rotates a work, and is reciprocatable in a Z direction which is parallel with an axis of rotation of said work;

a back spindle which is positioned oppositely to said main spindle, grips and rotates a work, and is reciprocatable in the Z direction;

a tool holding member which has a tool for machining said work attached thereto, is reciprocatable in the Z direction and also reciprocatable in an X direction different from the Z direction, and rotates in an X-Z plane including the Z direction and the X direction to change a direction of said tool; and a guide bush which rotatably supports said work projecting from said main spindle, and slides said work in a direction of axis of said work.

The tool holding member may has a plurality of tools for machining the work attached thereto, and is so structured as to position a tool selected from the plurality of tools at a predetermined position at which the work is to be machined.

The tool holding member may be constituted by a turret which has a plurality of tools for machining the work attached thereto and positions a tool, of the plurality of tools, that is to be used for machining at a predetermined position at which the work is to be machined.

The tool holding member may be constituted by a tool spindle to which a tool for machining the work is attached.

The lathe may further comprise: a tool magazine which contains a plurality of tools; and a tool exchange mechanism which exchanges the attached tool to a tool contained in the tool magazine.

The main spindle may comprise a hole through which the work penetrates. In this case, the work can be gripped by the main spindle and can extend by penetrating through the hole.

The back spindle may comprise a hole through which the work penetrates. In this case, the work can be gripped by the back spindle and can extend by penetrating through the hole.

The tool holding member is reciprocatable in, for example, the Z direction (Z2-axis direction) and the X direction (X1-axis direction), and is also reciprocatable in a Y direction which is different from the Z and X directions.

The lathe may comprise a tool rest which has one or a plurality of tools mounted thereon, and works independently from the tool holding member to machine the work gripped by the main spindle or by the back spindle by using the mounted tool. It is preferred that the tool rest be movable in the X direction, the Z direction, and the Y direction. The lathe may comprise a controller which controls positions of the main spindle and back spindle and work gripping and work rotation by the spindles, and controls a position and direction of the tool holding member.

The main spindle and the back spindle can independently grip works respectively, and can grip one work in cooperation with each other.

A lathe according to a second aspect of the present invention comprises:

first spindle means for gripping a work to rotate said work about a predetermined rotation axis which extends in a Z direction, and to move said work in parallel with said rotation axis;

guide bush means for supporting said work gripped by said first spindle means;

second spindle means for gripping a work coaxially with said first spindle means to rotate said work about said rotation axis and to move said work in parallel with said rotation axis; and a tool holding means which is reciprocatable in the Z direction and also reciprocatable in an X direction different from the Z direction, and rotates in an X-Z plane including the Z direction and the X direction to change a direction of a tool to make the tool machine said work.

The first spindle means and the second spindle means can independently grip works respectively, and can grip one work in cooperation with each other.

The tool holding means includes, for example, means which has a plurality of tools for machining the work attached thereto, and positions a tool selected from the plurality of tools at a predetermined position at which the work is to be machined.

The lathe may comprise means which holds a tool and machines one or a plurality of works gripped by the first spindle means and/or the second spindle means.

BRIEF DESCRIPTION OF THE DRAWINGS

These objects and other objects and advantages of the present invention will become more apparent upon reading of the following detailed description and the accompanying drawings in which:

FIG. 30 are explanatory diagrams of a machining example 22;

FIG. 31 is an explanatory diagram of a machining example 23;

DETAILED DESCRIPTION OF THE INVENTION

FIRST EMBODIMENT

A lathe according to the first embodiment of the present invention will now be explained.

Figure 1:
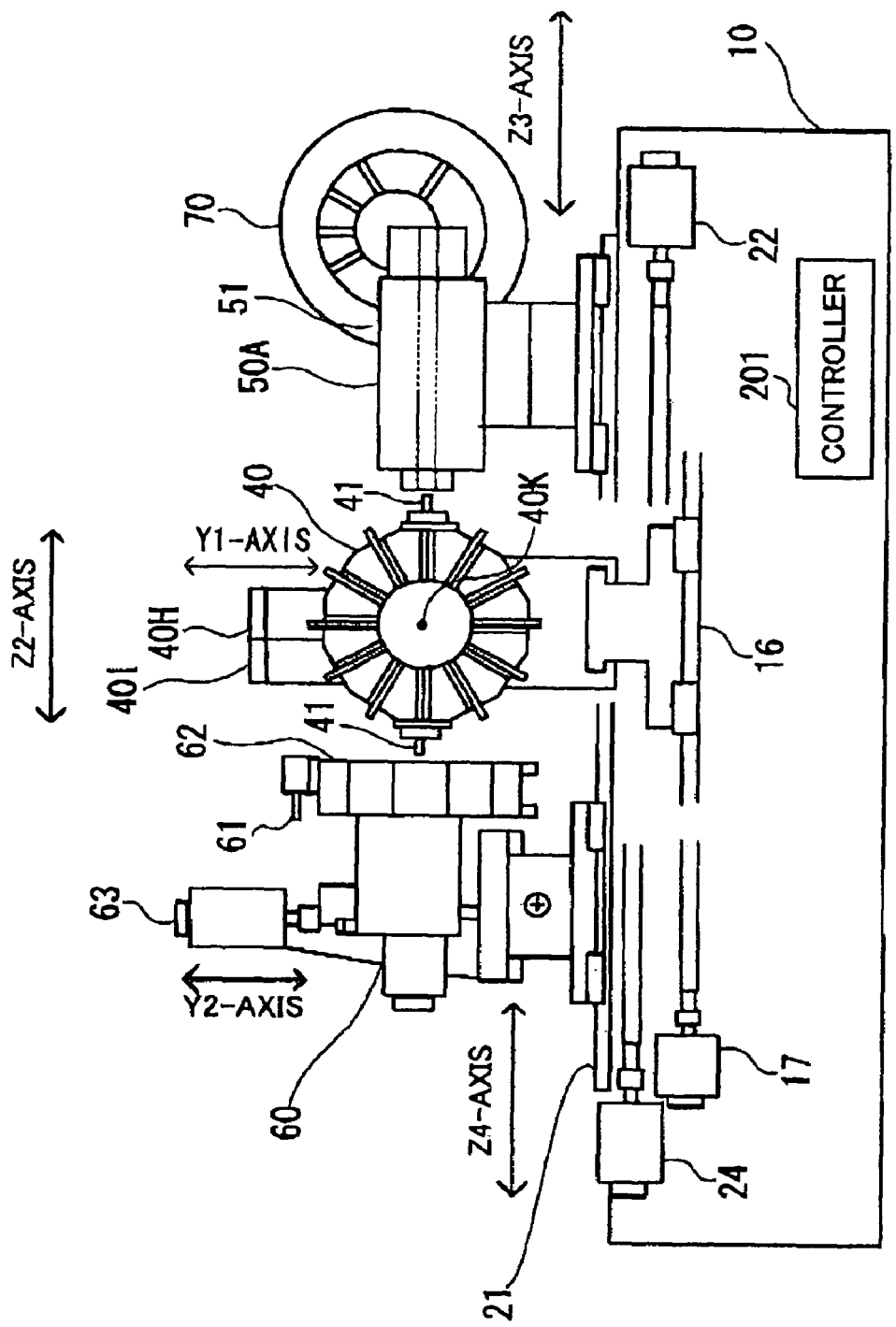
FIG. 1 is a front elevation of a lathe according to a first embodiment of the present invention.
Figure 2:
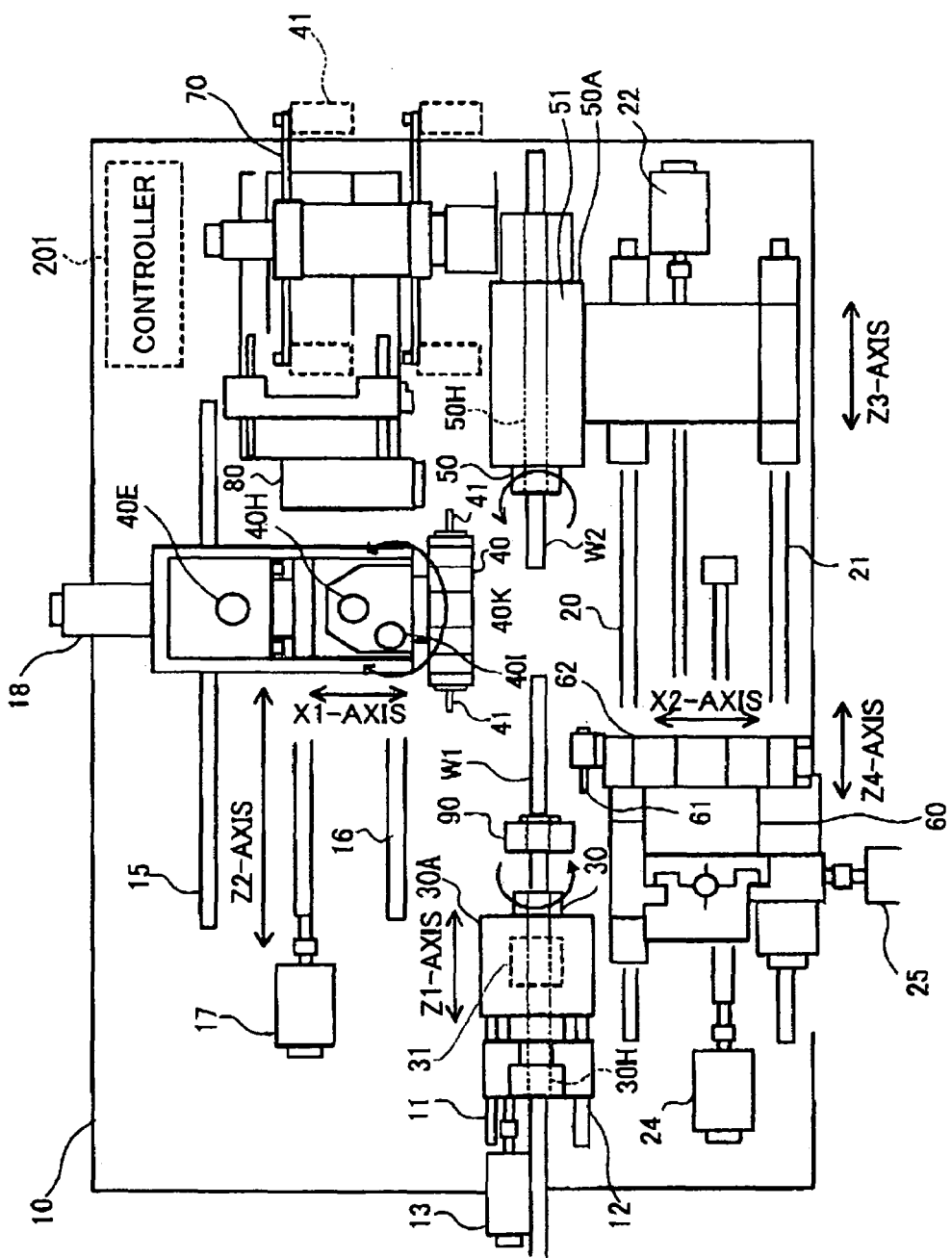
FIG. 2 is a plan view of the lathe.

This lathe is a machine that can apply complex machining to a work W. As shown in FIG. 1 and FIG. 2, the lathe comprise a bed 10, a main spindle 30 for gripping the work W, a turret 40, and a back spindle 50 for gripping the work W. In addition, the lathe comprises a controller 201 there inside. The controller 201 controls the lathe on the whole.

The main spindle 30 has, for example, a chuck and grips the work W such that the centerline of the work W is oriented in a Z1-axis direction, which is one of the horizontal directions. The main spindle 30 is rotatably supported by a headstock 30A. The headstock 30A is mounted on two rails 11 and 12, and designed so as to move in the Z1-axis direction by driving a Z1-axis motor 13. The two rails 11 and 12 are laid on the bed 10 in parallel with the Z1-axis direction. The headstock 30A has a built-in work rotation motor 31. The work rotation motor 31 rotates the work gripped by the main spindle 30. The main spindle 30 has a hole 30H through which work W penetrates, so that the work can be gripped by said main spindle 30 and can extend by penetrating through said hole 30H.

The turret 40 is rotatable about a rotation axis 40K. The turret 40 has a plurality of tools 41 attached thereto along its circumferential direction. The turret 40 rotates and thereby moves a selected tool 41 to a machining position where the work W is to be machined. According to the present embodiment, a position where the centerline of a selected tool 41 becomes horizontal is the predetermined position. The turret 40 has its position changed by a turret position setting mechanism to be explained later. The turret 40 has an unillustrated built-in motor for rotating each tool 41.

The turret position setting mechanism will now be explained with reference to FIG. 1, FIG. 2, and FIG. 3.

The turret position setting mechanism comprises a base 40A. The base 40A is mounted on two rails 15 and 16. The two rails 15 and 16 are laid on the bed 10 in a Z2-axis direction that is parallel with the Z1-axis direction. By driving a Z2-axis motor 17, the base 40A moves in the Z2-axis direction.

A ball screw 40B is incorporated into the base 40A such that it extends in an X1-axis direction which is one horizontal direction perpendicular to the Z2-axis. An X1-axis motor 18 for rotating the ball screw 40B is provided at the end of the ball screw 40B.

A column 40C is provided on the base 40A. A bracket 40J which is locked to the ball screw 40B is attached to the bottom of the column 40C. When the X1-axis motor 18 rotates, the column 40C moves in the X1-axis direction.

A ball screw 40D is incorporated into the column 40C such that it extends in a Y1-axis direction, which is a direction of height perpendicular to the Z2-axis and X1-axis directions. A Y1-axis motor 40E is attached to the end of the ball screw 40D.

A bracket 40F is locked to the ball screw 40D. The bracket 40F is movable in the Y1-axis direction. A support unit 40G for supporting the rotation shaft of the turret 40 is rotatably attached to the bracket 40F.

The support unit 40G has a direction change motor 40H and a tool selection motor 40I.

The direction change motor 40H changes the direction of the turret 40 by rotating the support unit 40G in a plane including the Z2-axis and the X1-axis. The tool selection motor 40I makes the center axis of a selected tool 41 horizontal by rotating the turret 40 about the rotation axis 40K.

When the Y1-axis motor 40E rotates, the bracket 40F and the support unit 40G move in the Y1-axis direction. As a result, the height of the centerline of the tool 41 which is selected to be made horizontal is shifted from the height of the centerline of the work W.

The above-described is the turret position setting mechanism.

The back spindle 50, for example, a chuck and grips the work W, while being opposed to the main spindle 30. The back spindle 50 is supported by a back headstock 50A. The back headstock 50A is mounted on two rails 20 and 21. The two rails 20 and 21 are laid on the bed 10 such that they extend in a Z3-axis direction which is parallel with the Z1-axis direction. By driving a Z3-axis motor 22, the back headstock 50A moves in the Z3-axis direction along the rails 20 and 21. The back headstock 50A has a built-in work rotation motor 51. The work rotation motor 51 rotates the work W gripped by the back spindle 50. The back spindle 50 has a hole 50H through which work W penetrates, so that the work can be gripped by the back spindle 50 and can extend by penetrating through said hole 50H.

The main spindle 30 and the back spindle 50 have a hole formed therein, through which the work W penetrates.

The lathe further comprises a tool rest 60, a tool magazine 70, a tool exchange mechanism 80, and a guide bush 90.

The tool rest 60 is mounted on the rails 20 and 21. By driving a Z4-axis motor 24, the tool rest 60 moves in a Z4-axis direction which is parallel with the Z2-axis direction. An X2-axis motor 25 is provided at a side of the tool rest 60. The X2-axis motor 25 moves the tool rest 60 in an X2-axis direction which is parallel with the X1-axis direction.

Figure 3:
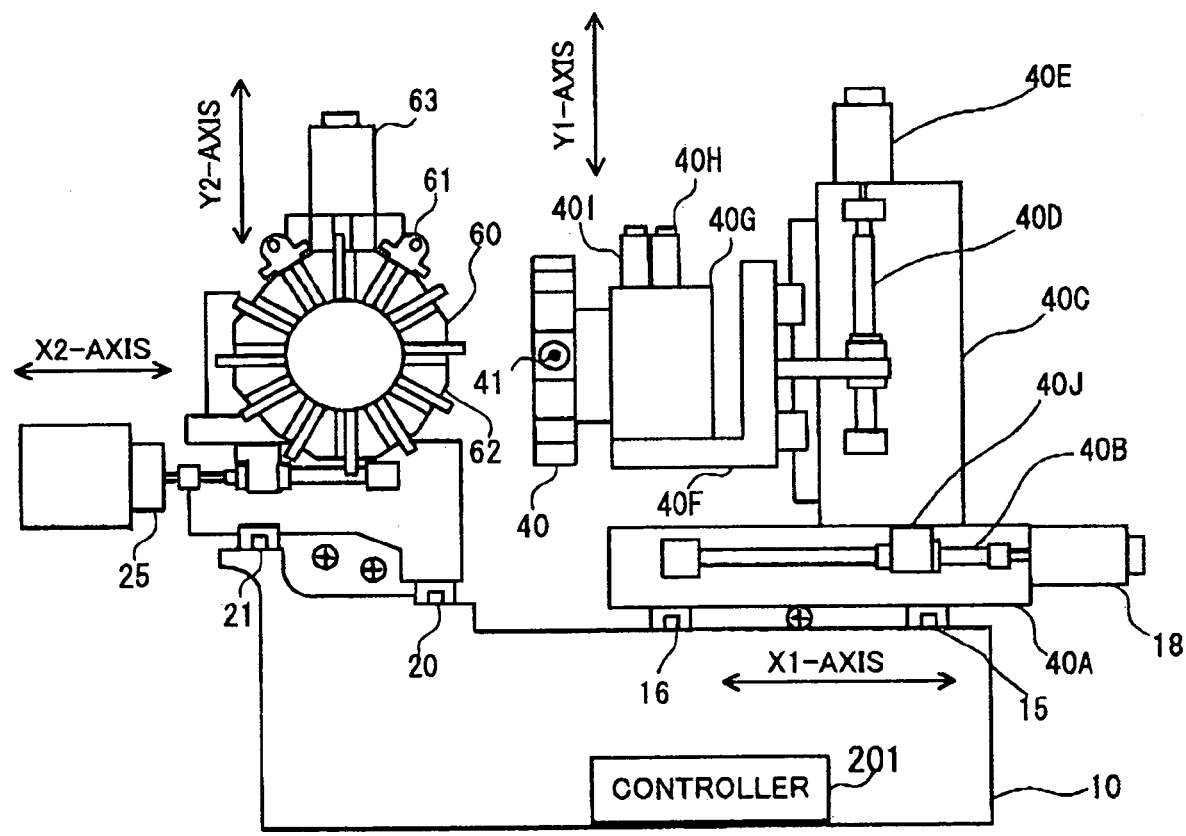
FIG. 3 is a diagram showing an example of configuration of a turret and a tool rest shown in FIG. 1.

The tool rest 60 holds a plurality of tools 61 for machining the work W, and has a turret 62 as shown in FIG. 3. The tools 61 are attached to the turret 62. A tool 61 corresponding to a rotation angle of the turret 62 is selected for machining. A Y2-axis motor 63 is attached to the top of the tool rest 60. The Y2-axis motor 63 changes the position of the tool rest 60 in a Y2-axis direction which is parallel with the Y1-axis direction, i.e., adjusts the height of the tool rest 60.

The guide bush 90 is provided on the main spindle 30 at the side of the back spindle 50. The guide bush 90 slidably supports a portion of the rotating work W that projects from the main spindle 30.

Figure 4:
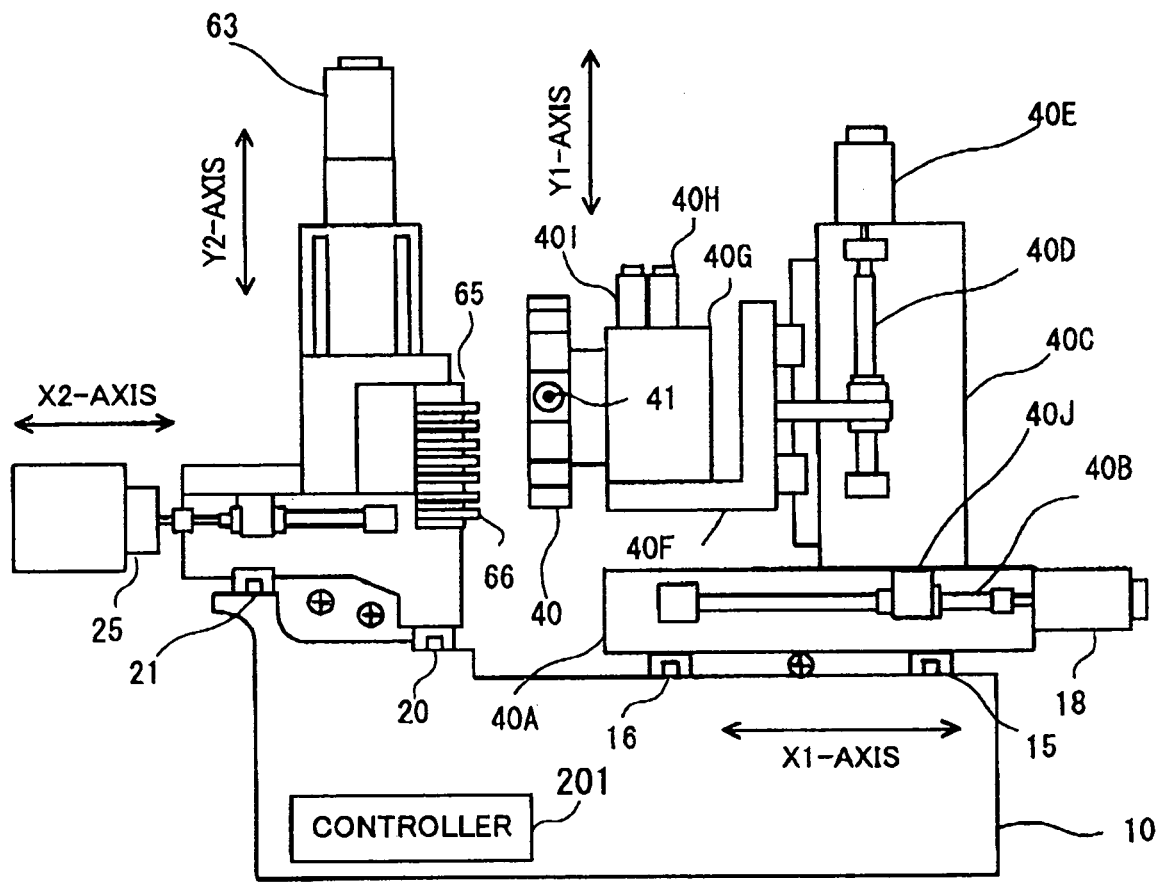
FIG. 4 is a diagram showing an example of modification of the tool rest.

In the present embodiment, the tool rest 60 comprises the turret 62. However, the present invention is not limited to this, but a plurality of tools 66 may be arrayed in a support member 65 in a gang arrangement as shown in FIG. 4. FIG. 4 is a diagram showing a modified example of the tool rest.

The tool magazine 70 contains the plurality of tools 41 to be attached to the turret 40. The tool exchange mechanism 80 exchanges a tool 41 attached to the turret 40 with a tool 41 contained in the tool magazine 70.

The lathe having the above-described configuration has the main spindle 30, the back spindle 50, and the guide bush 90. Accordingly, even when machining a lengthy work W, the lathe can prevent the work W from being bent and thus can apply a highly precise machining to the work W. Further, the lathe can machine the end surface of the work W.

Furthermore, the lathe can machine both end surfaces of the work W by cutting off the work W gripped by the main spindle 30 by a tool attached to, for example, the turret 40, machining one end surface of the work W while gripping the work W by the main spindle 30, then gripping the work W by the back spindle 50 to machine the other end surface of the work W. Accordingly, the lathe can machine works having varied lengths from a short length to a long length, entirely without excluding both end surfaces thereof, into complex shapes.

Next, the outline of the control executed by the controller 201 and the operation of the lathe will be explained along with explanation of examples of machining.

Figure 5:
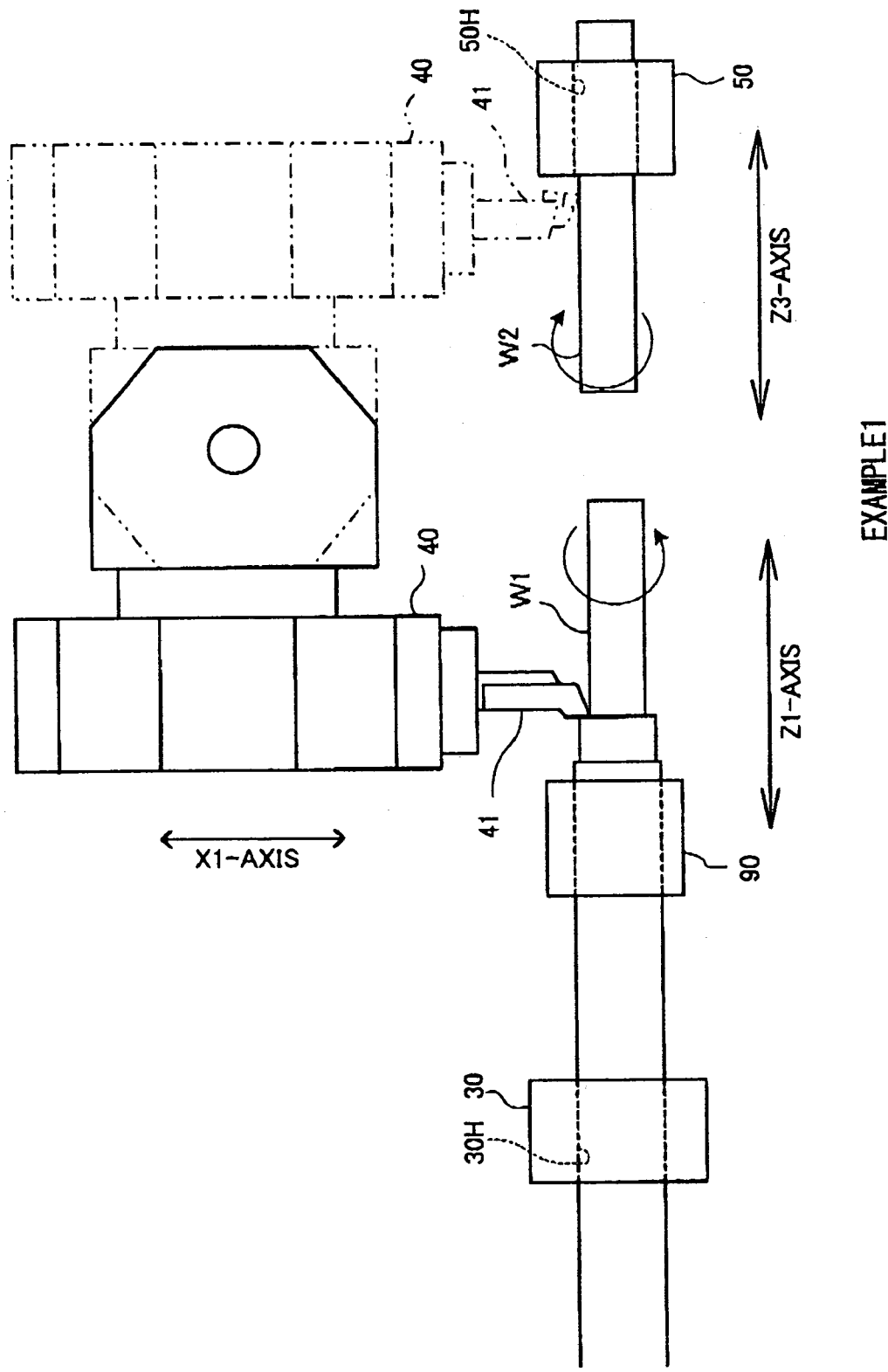
FIG. 5 is an explanatory diagram of a machining example 1.

FIG. 5 is an explanatory diagram of a machining example 1 in which outer diameter machining is applied to both of a work W1 gripped by the main spindle 30 and a work W2 gripped by the back spindle 50.

In a case where the works W1 and W2 gripped by the main spindle 30 and back spindle 50 respectively are to be machined, the controller 201 selects tools 41 for outer diameter machining from the plurality of tools 41 attached to the turret 40 (step S101), and rotates the tool selection motor 40I such that the centerline of the selected tools 41 horizontally faces the works W1 and W2 (step S102). Further, the controller 201 drives the direction change motor 40H to rotate the support unit 40G, and adjusts the direction of the turret 40 in a horizontal plane such that the centerline of the selected tool 41 becomes perpendicular to the centerline of the work W1 (step S103).

Then, by driving the Z1-axis motor 13 or the Z2-axis motor 17, the controller 201 positions the portion of the work W1 to be machined in front of the tool 41 (step S104). Then, while rotating the work W1 by driving the work rotation motor 31, the controller 201 drives the Z1-axis motor 13 and the X1-axis motor 18 (step S105). That is, the controller 201 controls the Z1-axis motor 13 and the X1-axis motor 18 such that the tool 41 abuts on the work W1 and machines the outer circumference of the work W1 gripped by the main spindle 30. After finishing machining of the work W1 gripped by the main spindle 30, the controller 201 drives the X1-axis motor 18 to retreat the turret 40 (step S106).

Then, the controller 201 drives the direction change motor 40H to rotate the support unit 40G by 180°, and at the same time, drives the tool selection motor 40I to rotate the direction of the selected tool 41 by 180° (step S107). Then, by driving the Z3-axis motor 22 and the Z2-axis motor 17, the controller 201 positions the portion to be machined of the work W2 gripped by the back spindle 50 in front of the selected tool 41 (step S108). While rotating the work W2 by driving the work rotation motor 51, the controller 201 drives the Z3-axis motor 22 and the X1-axis motor 18 (step S109).

As a result, the selected tool 41 abuts on the work W2, thereby machining the outer circumference of the work W2 gripped by the back spindle 50. Various kinds of machining are available depending on the kind of the selected tool 41 and the manner of driving the Z1-axis motor 13, the Z2-axis motor 17, the Z3-axis motor 22, and the X1-axis motor 18, and the works W1 and W2 can be formed into a desired shape such as a linear shape, a tapered shape, a circular arc shape, etc.

Figure 6:
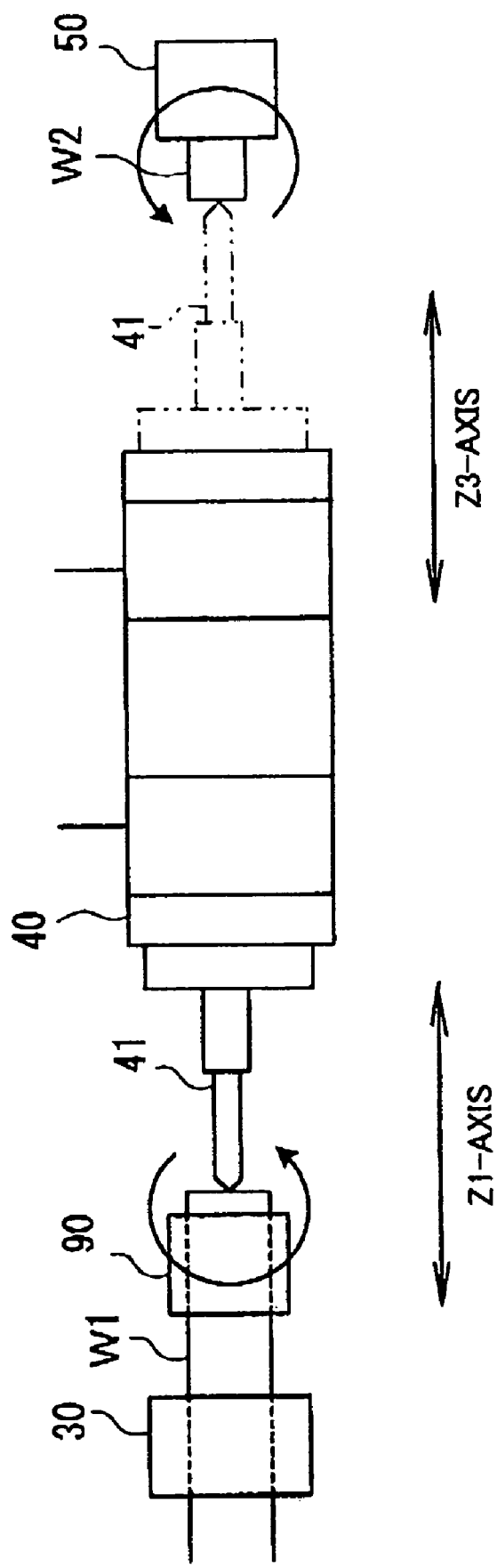
FIG. 6 is an explanatory diagram of a machining example 2.

FIG. 6 is an explanatory diagram of a machining example 2 in which hole drilling machining is applied to an end surface of both of a work W1 gripped by the main spindle 30 and a work W2 gripped by the back spindle 50.

In this case, the controller 201 selects a drill having a predetermined diameter from the plurality of tools 41 attached to the turret 40, as a machining tool 41 (step S201). The controller 201 rotates the tool selection motor 40I such that the centerline of the selected tool 41 becomes horizontal (step S202). The controller 201 drives the direction change motor 40H and rotates the support unit 40G such that the centerline of the selected tool 41 becomes parallel with the centerline of the work W1, thereby adjusting the direction of the turret 40 in a horizontal plane (step S203). Then, the controller 201 drives the X1-axis motor 18 to move the turret 40 in the X1-axis direction, and make the tip of the selected tool 41 face the end surface of the work W1 gripped by the main spindle 30 (step S204). Then, the controller 201 drives the Z1-axis motor 13 while rotating the work W1 by driving the work rotation motor 31, and moves the tip of the selected tool 41 toward the main spindle 30 (step S205). As a result, the selected tool 41 cuts the end surface of the work W1 gripped by the main spindle 30, thereby drilling a hole in the work W1 (step S206).

After finishing machining of the work W1 gripped by the main spindle 30, the controller 201 drives the X1-axis motor 18 to retreat the turret 40 (step S207). Then, the controller 201 drives the tool selection motor 40I to rotate the turret 40 by 180° and make the tip of the selected tool 41 turn to the end surface of the work W2 gripped by the back spindle 50 (step S208). The controller 201 again drives the X1-axis motor 18 to make the selected tool 41 face the end surface of the work W2 gripped by the back spindle 50 (step S209). The controller 201 drives the Z3-axis motor 22 while rotating the work W2 by driving the work rotation motor 51, and moves the tip of the selected tool 41 toward the back spindle 50 (step S210). Due to this, the selected tool 41 cuts the end surface of the work W2 gripped by the back spindle 50, and a hole is drilled in the work W2 (step S211).

The outline of the case where hole drilling machining is applied to an end surface of both of the work W1 gripped by the main spindle 30 and the work W2 gripped by the back spindle 50 has been described. However, it is possible to drill a hole in both end surfaces of one work W.

In this case, the controller 201 controls the work W to be gripped by only the main spindle 30 (step S301). Then, the controller 201 applies hole drilling machining to the front end surface of the work W (step S302). When finishing hole drilling, the controller 201 drives the X1-axis motor 18 to retreat the turret 40 and the selected tool 41 (step S303). Then, by driving the Z3-axis motor 22, the controller 201 moves the back spindle 50 toward the main spindle 30 and controls the back spindle 50 to grip the end surface of the work W (step S304). After this, the controller 201 controls the main spindle 30 to release the work W (step S305), drives the Z3-axis motor 22 to move to a predetermined position (step S306), and returns the turret 40 and the selected tool 41 to the machining position by driving the X1-axis motor 18 (step S307). Thereafter, by performing the same processes as described above, the controller 201 performs hole drilling in the back end surface of the work gripped by the back spindle SO (step S308).

Figure 7:
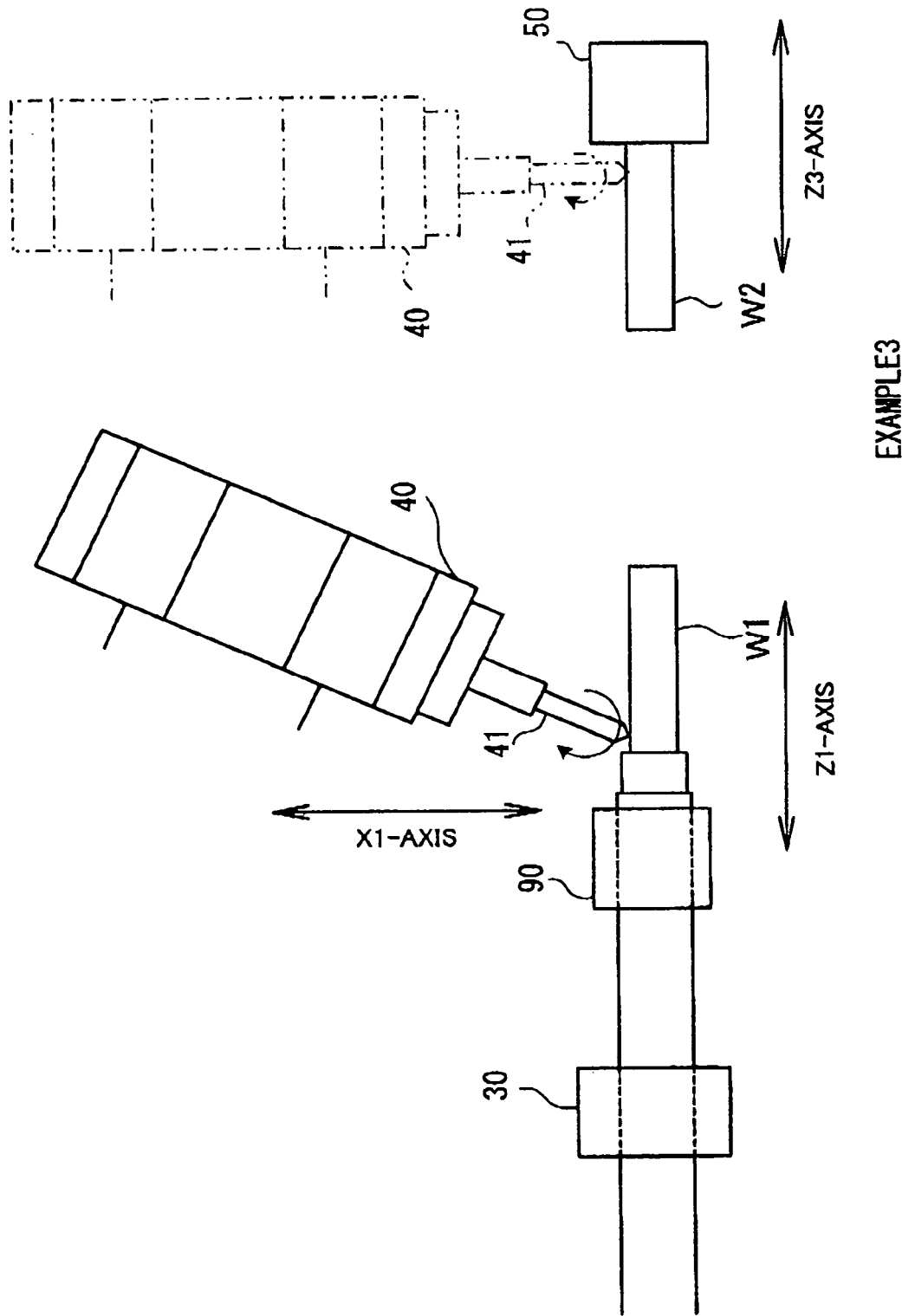
FIG. 7 is an explanatory diagram of a machining example 3.

FIG. 7 is an explanatory diagram of a machining example 3 in which angled hole drilling is performed (a hole slanted with respect to the axis of the work W is drilled in the work W).

In this case, the controller 201 selects a drill from the plurality of tools 41 attached to the turret 40, as a machining tool (step S401).

The controller 201 drives the tool selection motor 40I such that the centerline of the selected tool 41 becomes horizontal (step S402). The controller 201 drives the direction change motor 40H to rotate the support unit 40G, and adjusts the direction of the turret 40 such that the centerline of the selected tool 41 is at a desired angle with respect to the center axis of the work W (step S403).

Next, the controller 201 drives the Z1-axis motor 13 or the Z2-axis motor 17 to bring the work W to a predetermined position (step S404). After this, the controller 201 drives the Z1-axis motor 13 and the X1-axis motor 18 while rotating the selected tool 41, and moves the work W and the selected tool 41 relatively with respect to each other such that the tip of the selected tool 41 enters the work W at the desired angle with respect to the center axis of the work W (step S405). As a result, an angled hole is drilled in the work W gripped by the main spindle 30.

In a case where an angled hole is to be drilled in the work W gripped by the back spindle 50, the controller 201 drives the direction change motor 40H before drilling, in order to adjust the direction of the turret 40 such that the centerline of the tool 41 is at a desired angle with respect to the center axis of the work W gripped by the back spindle 50 (step S406). Next, the controller 201 drives the Z3-axis motor 22 or the Z2-axis motor 17 to bring the work W to a predetermined position (step S407). After this, the controller 201 concurrently drives the Z3-axis motor 22 and the X1-axis motor 18 while rotating the selected tool 41, to move the work W and the selected tool 41 relatively with respect to each other such that the tip of the selected tool 41 enters the work W at the desired angle (step S408). As a result, an angled hole is drilled in the work W gripped by the back spindle 50.

Figure 8:
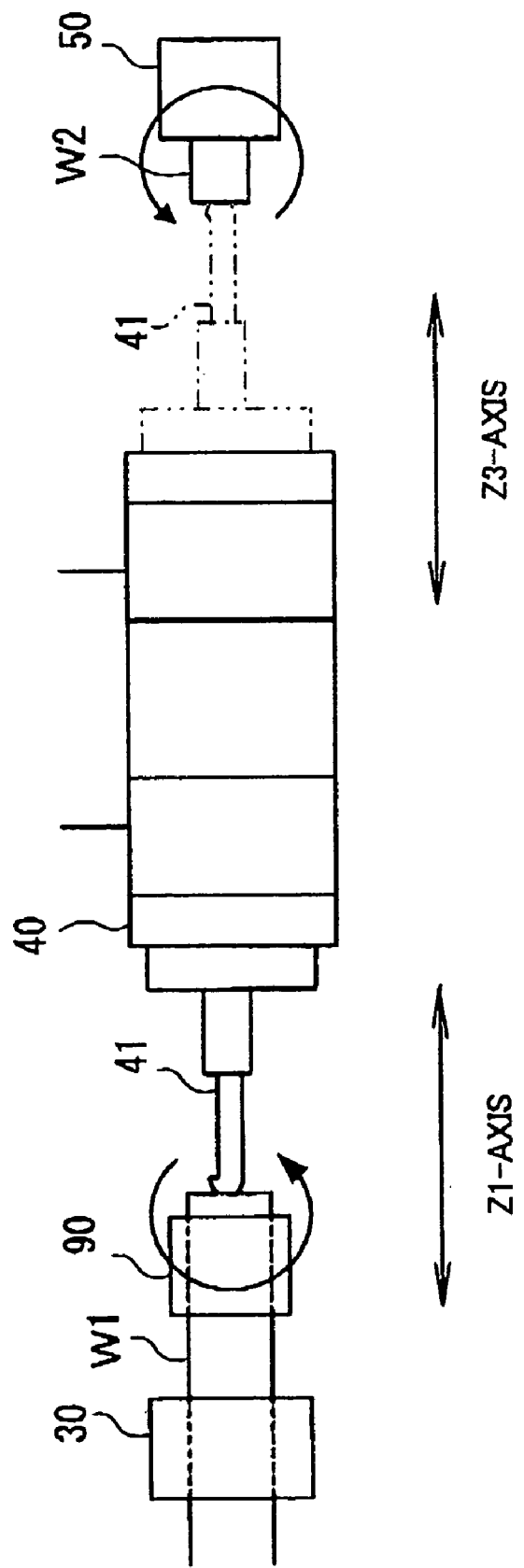
FIG. 8 is an explanatory diagram of a machining example 4.

FIG. 8 is an explanatory diagram of a machining example 4 where inner diameter machining is performed.

In a case where inner diameter machining is to be applied to the work W1 gripped by the main spindle 30 and the work W2 gripped by the back spindle 50, the controller 201 selects a tool 41 for inner diameter machining from the plurality of tools 41 attached to the turret 40 as a machining tool 41, and performs the same processes as for drilling a hole in the end surface.

That is, the controller 201 drives the direction change motor 40H to rotate the support unit 40G such that the centerline of the tool 41 for inner diameter machining becomes parallel with the centerline of the work W1, and adjusts the direction of the turret 40 (step S501). Then, the controller 201 drives the X1-axis motor 18 to make the tip of the selected tool 41 face the end surface of the work W1 gripped by the main spindle 30 (step S502). Next, while rotating the work W1 by driving the work rotation motor 31, the controller 201 drives the Z1-axis motor 13 to relatively move the tip of the selected tool 41 toward the main spindle 30 (step S503). Due to this, the selected tool 41 cuts the end surface of the work W1 gripped by the main spindle 30, thereby starting inner diameter machining of the work W1. Then, by driving the Z1-axis motor 13 and the X1-axis motor 18, the selected tool 41 is moved in the Z1-axis direction and in the X1-axis direction, and a hole having a desired inner diameter is thereby formed in the work W1 gripped by the main spindle 30.

After finishing the machining of the work W1 gripped by the main spindle 30, the controller 201 drives the X1-axis motor 18 to retreat the turret 40 (step S504). The controller 201 drives the tool selection motor 40I to rotate the selected tool 41 by 180° and make the tip of the selected tool 41 face the end surface of the work W2 gripped by the back spindle 50 (step S505). Then, the controller 201 rotates the work W2 by driving the work rotation motor 51, and drives the Z3-axis motor 22 to move the tip of the selected tool 41 toward the back spindle 50 (step S506). Then, by driving the Z3-axis motor 22 and the X1-axis motor 18, the controller 201 moves the selected tool 41 in the Z3-axis direction and in the X1-axis direction, thereby cutting the end surface of the work W2 gripped by the back spindle 50 (step S507). Due to this, a hole having a desired inner diameter is formed in the end surface of the work W2 gripped by the back spindle 50.

Figure 9:
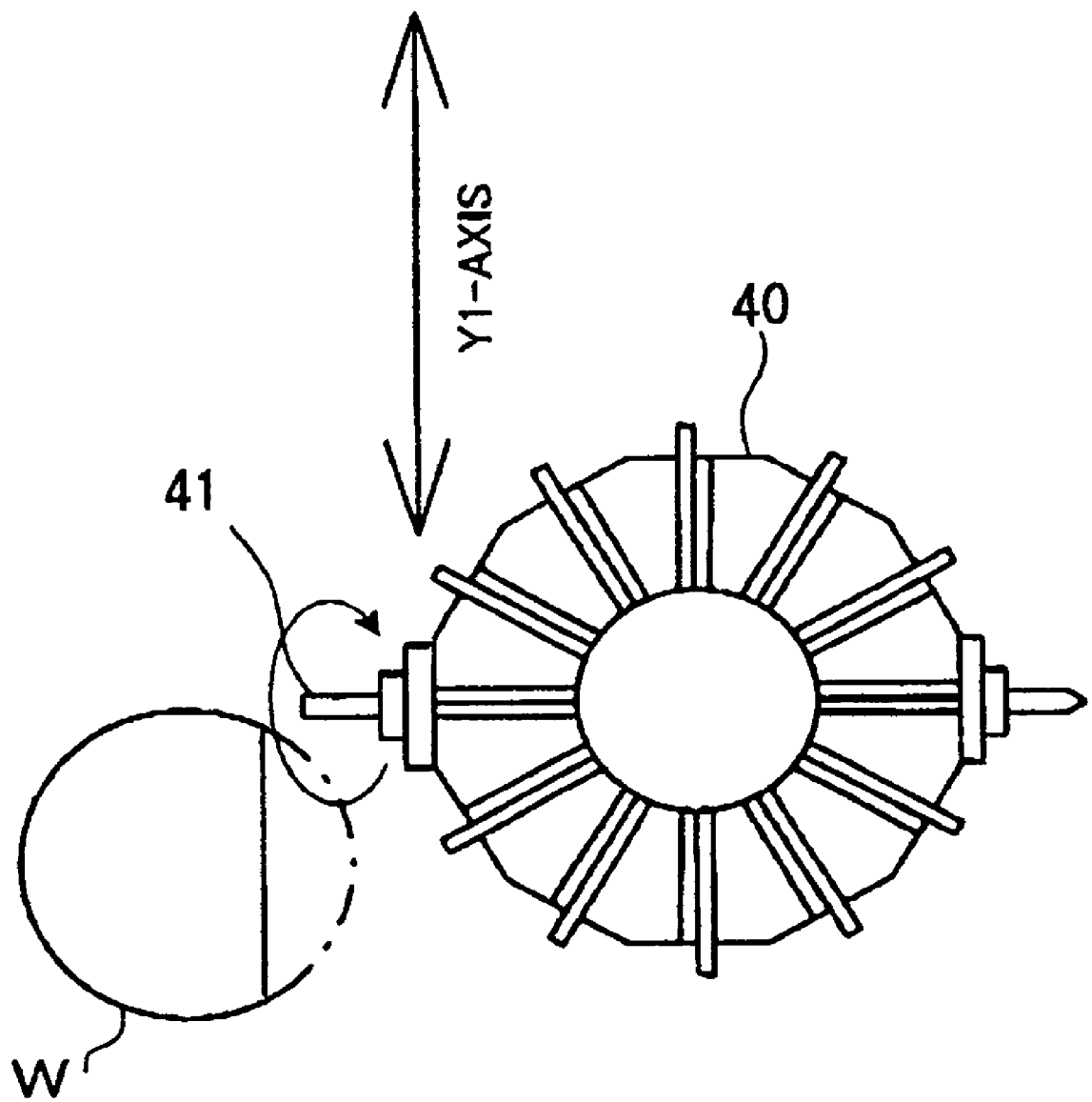
FIG. 9 is an explanatory diagram of a machining example 5.

FIG. 9 is an explanatory diagram of a machining example 5 in which the work W is cut linearly.

In a case where the work W is to be formed into a D character shape by cutting a portion of the work W, an end mill is attached to the turret 40 as a machining tool 41. The controller 201 drives the tool selection motor 40I and rotates the turret 40 such that the centerline of the selected tool 41 becomes horizontal. After this, the controller 201 drives the Y1-axis motor 40E while rotating the selected tool 41, to move the selected tool 41 in the Y1-axis direction, i.e., in the upward and downward direction, as shown in FIG. 9. Due to this, the work W is cut and the cross section of the work W becomes a D character shape.

Figure 10:
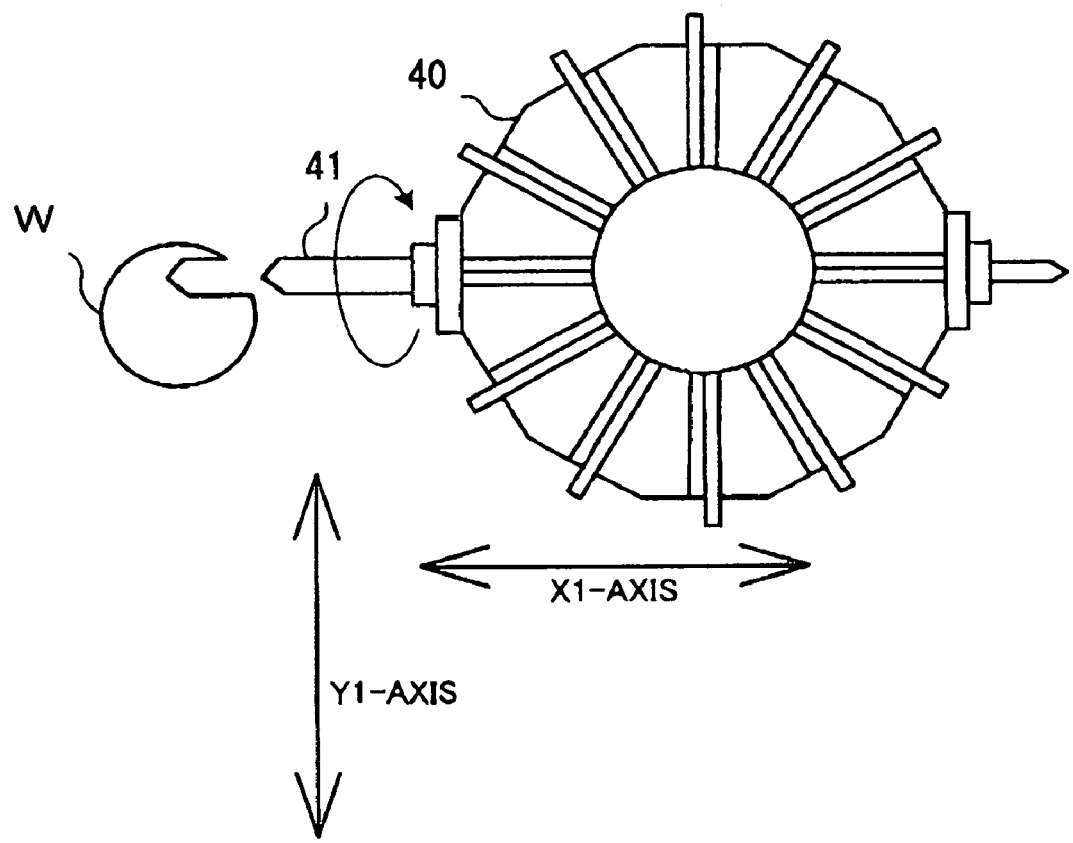
FIG. 10 is an explanatory diagram of a machining example 6.

FIG. 10 is an explanatory diagram of a machining example 6 in which an eccentric hole is drilled.

In a case where an eccentric hole is formed in the work W by drilling a portion that is decentered from the centerline of the work W, a drill is attached to the turret 40. The controller 201 selects the drill as a machining tool 41, and drives the tool selection motor 40I to rotate the turret 40 such that the centerline of the selected tool 41 becomes horizontal. Then, the controller 201 moves the turret 40 to a predetermined position by driving the Z2-axis motor 17, and thereafter, drives the Y1-axis motor 40E to move the centerline of the selected tool 41 off from the height of the centerline of the work W. Next, while rotating the selected tool 41, the controller 201 advances the tool 41 as shown in FIG. 10 by driving the X1-axis motor 18. As a result, an eccentric hole is formed in the work W.

Figure 11A:
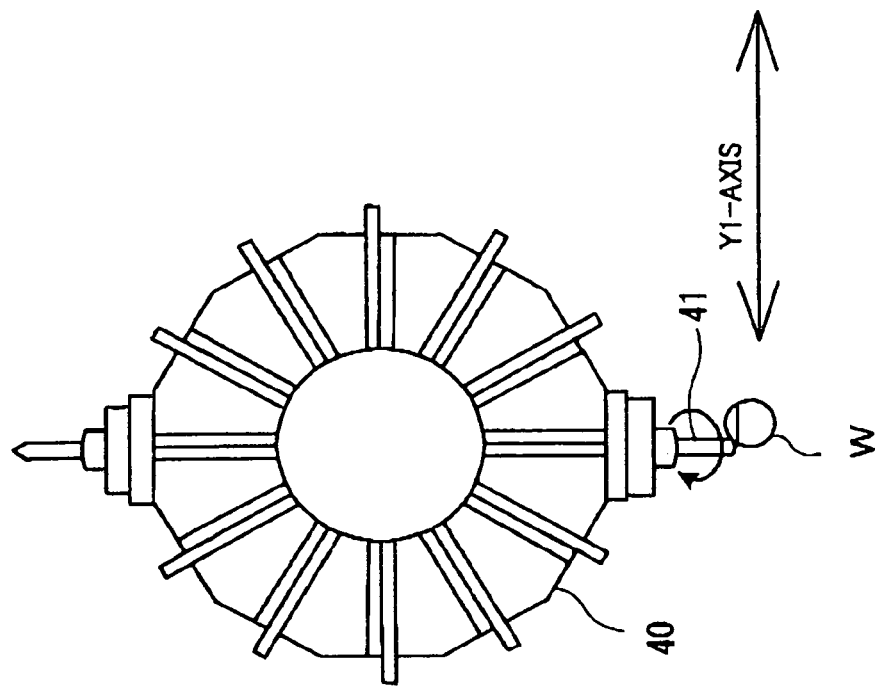
FIG. 11 are explanatory diagrams of a machining example 7.
Figure 11B:
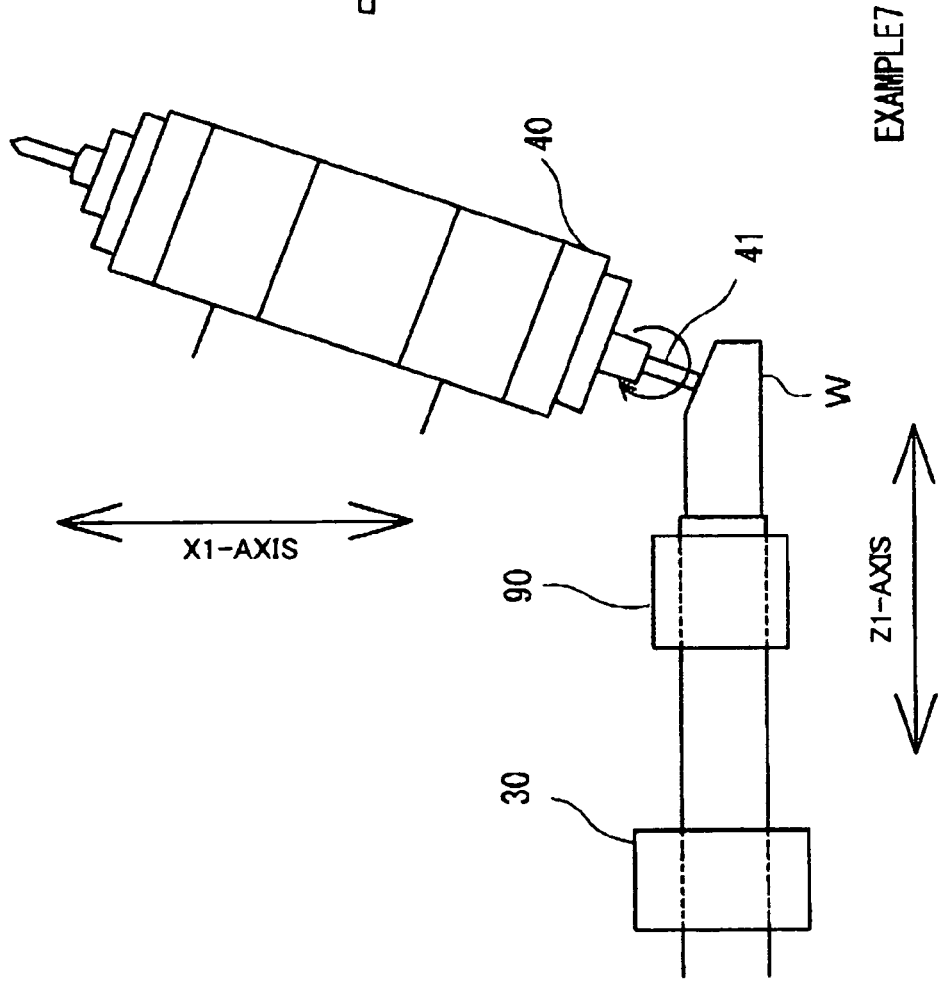

FIG. 11A and FIG. 11B are explanatory diagrams of a machining example 7 in which the end portion of the work W is obliquely cut, where FIG. 11A shows a front elevation and FIG. 11B shows a side elevation.

In a case where the work W is to be obliquely cut, an end mill is attached to the turret 40 as a tool 41. The controller 201 selects the end mill 41 as a machining tool (step S601), drives the tool selection motor 40I to rotate the turret 40 such that the centerline of the selected tool 41 becomes horizontal (step S602), Then, by driving the direction change motor 40H, the controller 201 adjusts the direction of the turret 40 such that the centerline of the selected tool 41 is at a desired angle with respect to the centerline of the work W gripped by the main spindle 30 (step S603). The controller 201 drives the Y1-axis motor 40E to move the selected tool 41 in the Y1-axis direction (step S604). Due to this, the end mill 41 obliquely contacts the end portion of the work W, thereby obliquely cutting the end portion of the work W.

Figure 12B:
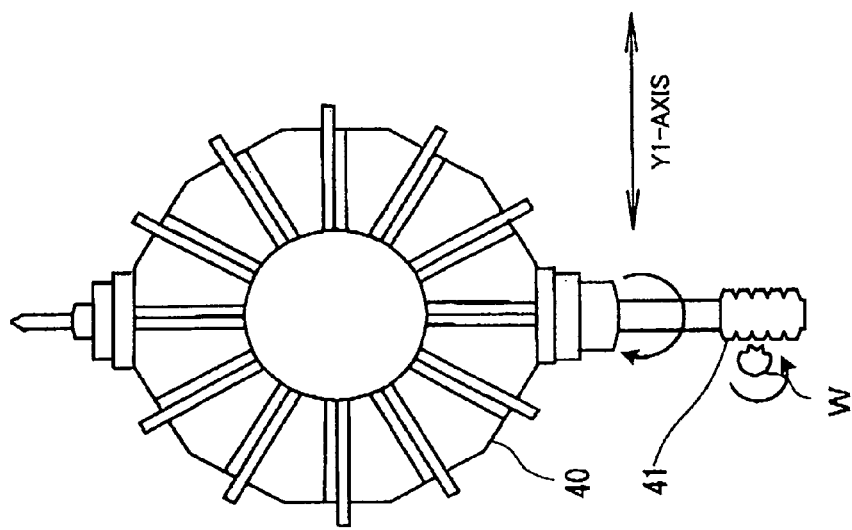
FIG. 12 are explanatory diagrams of a machining example 8.
Figure 12A:
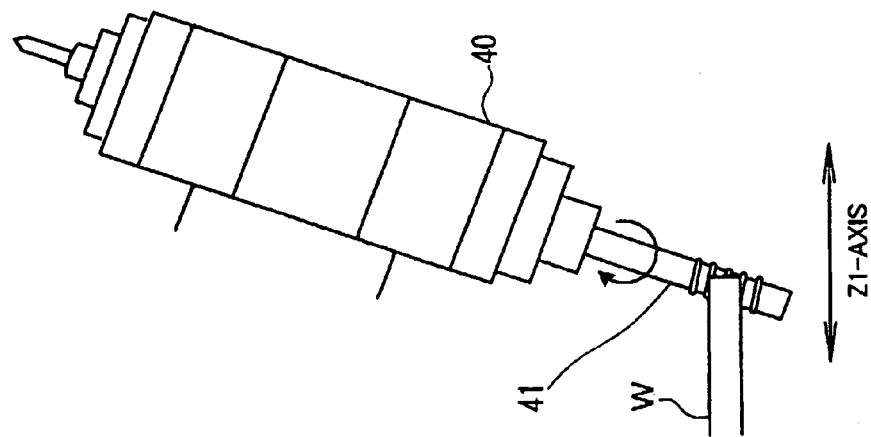

FIG. 12A and FIG. 12B are explanatory diagrams of a machining example 8 in which hob machining is applied to the work W, where FIG. 12A shows a front elevation and FIG. 12B shows a side elevation.

In a case where hob machining for forming the work W into a toothed gear is performed, a hob is attached to the turret 40 as a tool 41. The controller 201 selects the hob as a machining tool 41 (step S701), and drives the tool selection motor 40I to make the centerline of the hob horizontal (step S702). Next, the controller 201 moves the turret 40 to a predetermined position (step S703), and drives the direction change motor 40H to adjust the direction of the turret 40 such that the centerline of the selected tool is at a predetermined angle with respect to the centerline of the work W (step S704). Then, the controller 201 advances the work W by driving the Z1-axis motor 13, while synchronously controlling the rotation of the selected hob 41 and the rotation of the work W at a predetermined speed ratio (step S705). Due to this, the work W is moved while being cut by the selected tool 41, and a toothed gear is formed on the work W.

Figure 13:
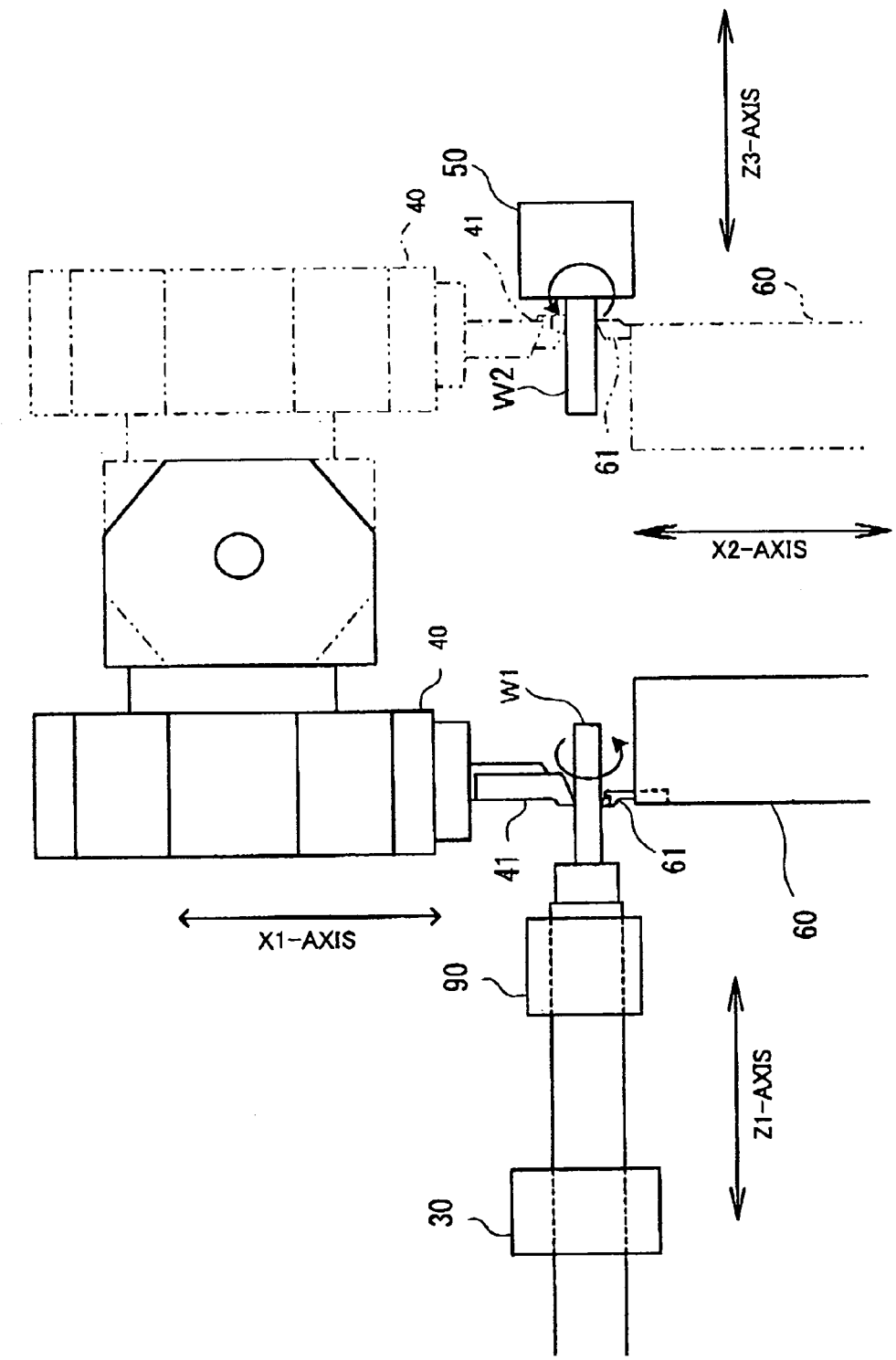
FIG. 13 is an explanatory diagram of a machining example 9.

FIG. 13 is an explanatory diagram of a machining example 9 in which outer diameter machining is applied to the work W by using a tool 41 and a tool 61.

In a case where outer diameter machining of the work W is performed by using the tool 41 attached to the turret 40 and the tool 61 attached to the tool rest 60, an outer diameter machining tool is attached to the turret 40. The controller 201 selects the outer diameter machining tool as a machining tool 41 (step S801), and drives the tool selection motor 40I to make the centerline of the selected tool 41 horizontal (step S802).

The controller 201 controls the main spindle 30, the back spindle 50, and the turret 40, in the same manner as for applying outer diameter machining to the work W by using only the tool 41.

On the other hand, an outer diameter machining tool is pre-attached to the tool rest 60 as a tool 61. As to the tool rest 60, the controller 201 rotates the turret 62 such that the selected tool 61 faces the outer circumferential surface of the work W (step S803), drives the X2-axis motor 25 (step S804) to make the tool 61 cut the outer circumference of the work W. Due to this, the outer diameter of the work W is machined by the tool 41 and the tool 61. The tool 41 and the tool 61 cut the work W while being positioned oppositely to each other with the work W placed therebetween. Accordingly, the work W is prevented from being fluctuated, and highly precise machining can be applied thereto, Further, since the outer diameter of the work W is machined by the two tools 41 and 61 simultaneously, the total machining time can be shortened.

Figure 14:
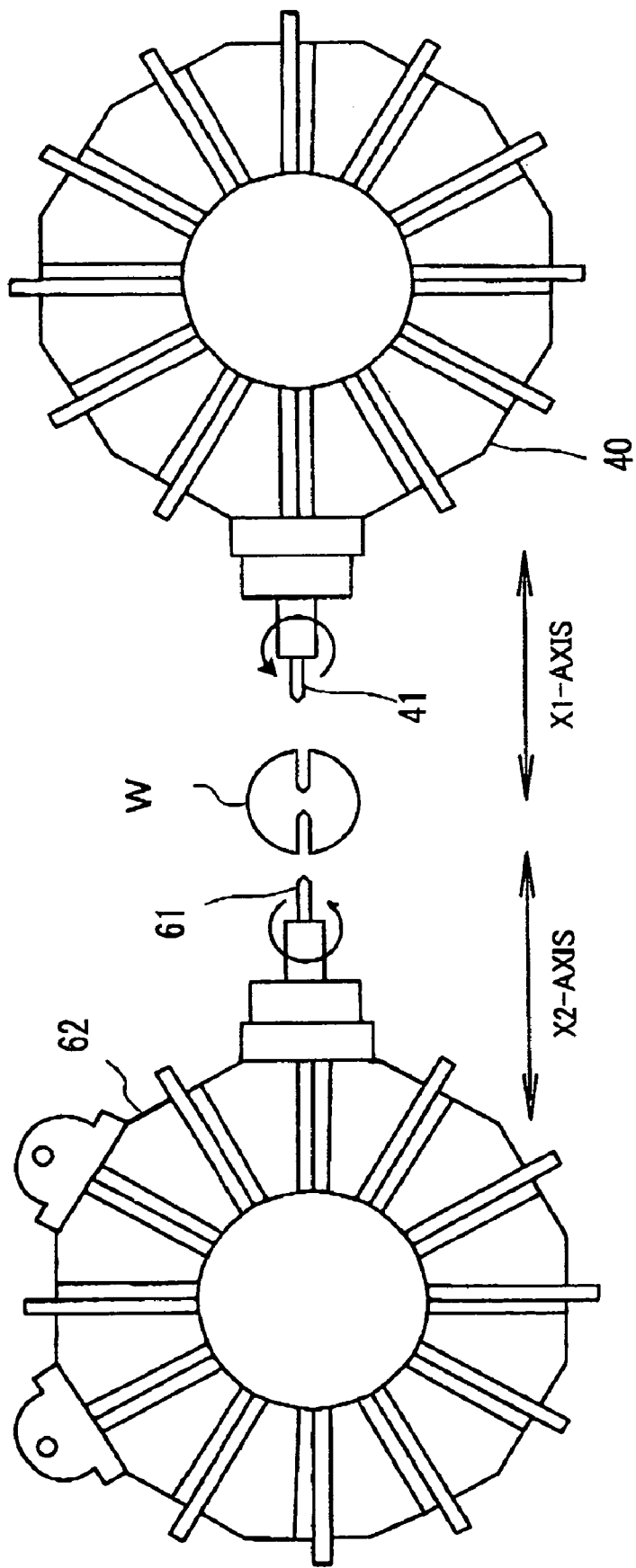
FIG. 14 is an explanatory diagram of a machining example 10.

FIG. 14 is an explanatory diagram of a machining example 10 in which hole drilling machining is applied to the work W by using the tool 41 and the tool 61.

In a case where hole drilling machining is applied to the work W, drills are attached to the turret 40 and the tool rest 60 respectively. The controller 201 selects the drill on the tool rest 60 (step S901), and rotates the turret 62 such that the centerline of the selected tool 61 horizontally faces the work W (step S902). Further, the controller 201 selects the drill on the turret 40 as a machining tool 41 (step S903), and drives the tool selection motor 40I such that the centerline of the selected tool 41 horizontally faces the work W (step S904).

Next, the controller 201 drives the Z2-axis motor 17 and the Z4-axis motor 24 to move the selected tools 41 and 61 to predetermined positions (step S905). After this, while rotating the tool 41 and the tool 61, the controller 201 drives the X1-axis motor 18 and the X2-axis motor 25 to advance the tool 41 and the tool 61 toward the work W (step S906). By advancing, the tool 41 and the tool 61 abut on the work W and cut it. Due to this, holes are formed symmetrically in the work W.

The tool 41 and the tool 61 cut the work W while being positioned oppositely to each other with the work W placed therebetween. Accordingly, the work W can be prevented from being fluctuated, and highly precise machining can be applied thereto. Further, since the work W is machined by the two tools 41 and 61 simultaneously, the total machining time can be shortened, as compared to a case where only the tool 41 is used for machining.

Figure 15:
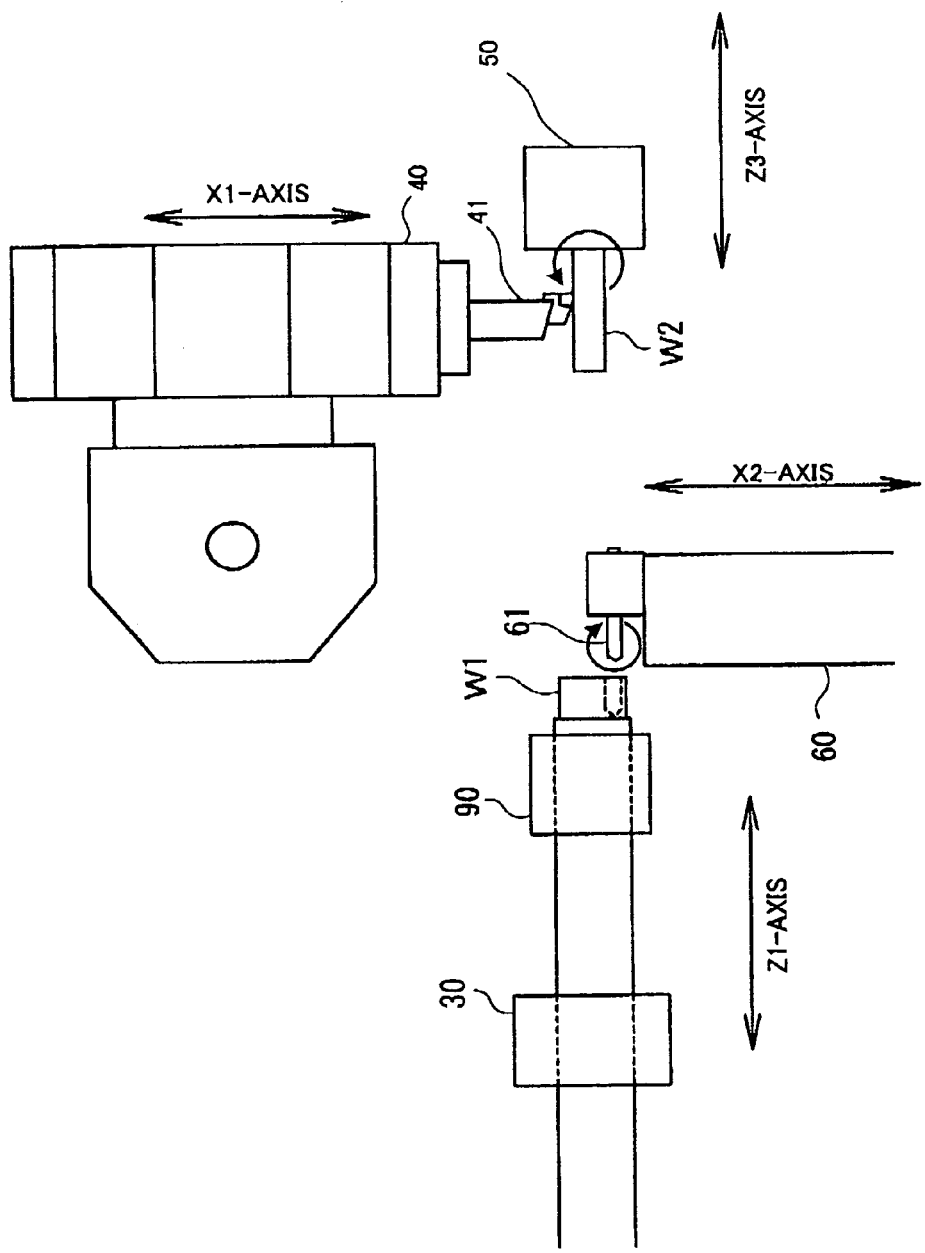
FIG. 15 is an explanatory diagram of a machining example 11.

FIG. 15 is an explanatory diagram of a machining example 11 in which two works W1 and W2 are machined simultaneously.

For example, in a case where machining for boring an eccentric hole in the end portion of the work W1 gripped by the main spindle 30 is performed, and at the same time, outer diameter machining is applied to the work W2 gripped by the back spindle 50, an outer diameter machining tool is attached to the turret 40 and a drill is attached to the tool rest 60.

The controller 201 selects the outer diameter machining tool from the plurality of tools 41 attached to the turret 40 as a machining tool 41 (step S1001), and controls the centerline of the selected tool 41 to become horizontal at the same height as the work W2 gripped by the back spindle 50 and to face the work W2 in this state. The controller 201 selects the drill on the tool rest 60 as a machining tool 61, and adjusts the selected tool 61 such that its tip faces the portion to be machined of the work W1 gripped by the main spindle 30 by rotating the turret 62 and driving the X2-axis motor 25 (step S1002). Then, the controller 201 drives the X1-axis motor 18 to advance the selected tool 41 to a predetermined position (step S1003). Further, the controller 201 controls the selected tool 61 to advance toward the work W1 gripped by the main spindle 30 by driving the Z1-axis motor 13 while rotating the tool 61. As a result, an eccentric hole (a hole bored at a position decentered from the center of the work W1) is bored in the end portion of the work W1 gripped by the main spindle 30.

In parallel with these operations, the controller 201 drives the work rotation motor 51 to rotate the work W2, and drives the X3-axis motor 22 to advance the work W2 (step S1004). Due to this, the outer circumferential surface of the work W2 gripped by the back spindle 50 is cut.

Figure 16:
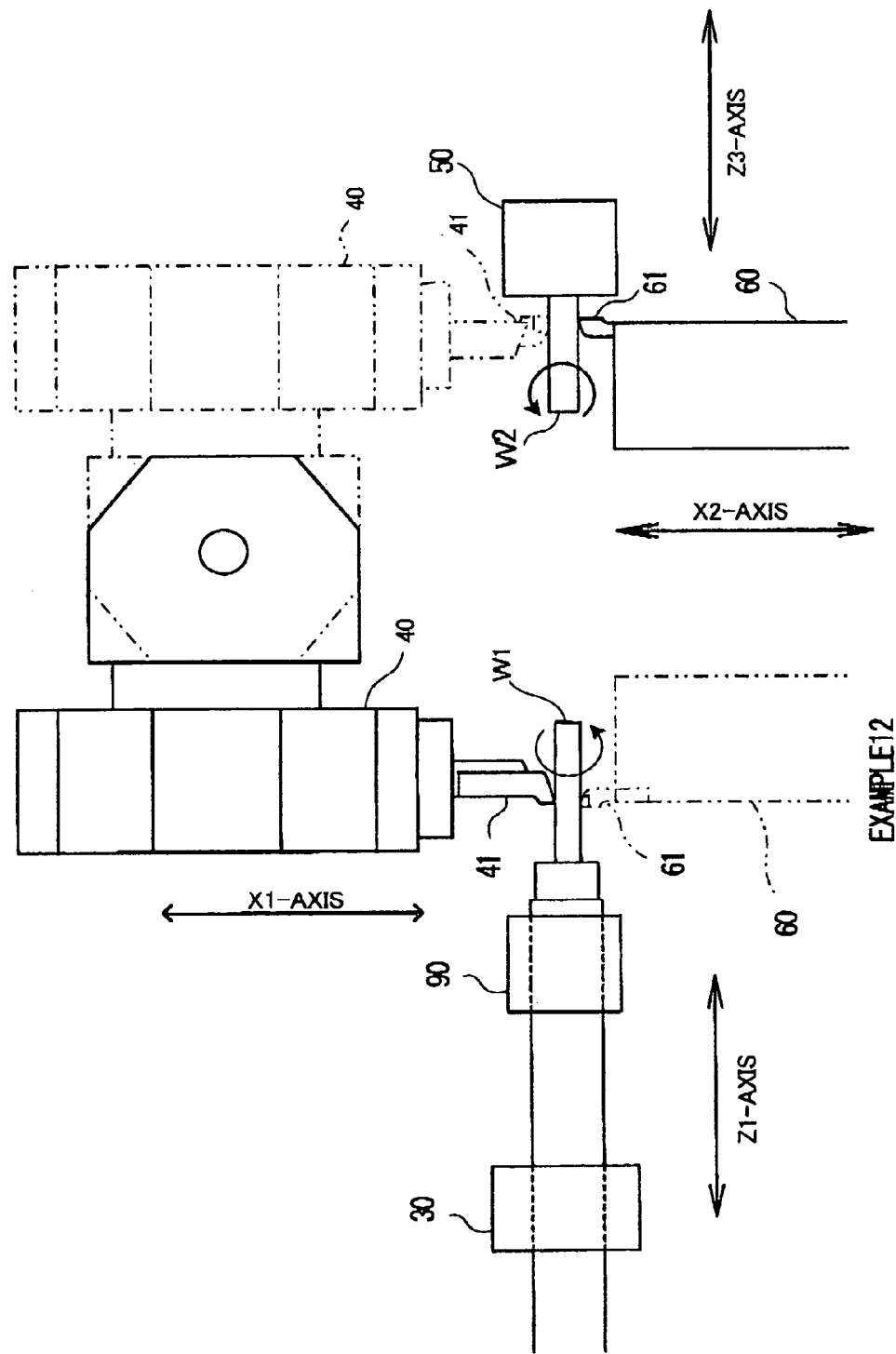
FIG. 16 is an explanatory diagram of a machining example 12.

FIG. 16 is an explanatory diagram of a machining example 12 in which two works W1 and W2 are machined simultaneously.

A desired machining tool 41, for example, an outer shape machining tool is attached to the turret 40, and a desired machining tool 61, for example, an outer shape machining tool is attached to the tool rest 60.

As shown by solid lines, the work W1 gripped by the main spindle 30 is machined by the tool 41 attached to the turret 40, and the work W2 gripped by the back spindle 50 is simultaneously machined by the tool 61 attached to the tool rest 60.

Further, the work W1 gripped by the main spindle 30 is machined by the tool 41 attached to the turret 40 and the tool 61 attached to the tool rest 60 as shown by solid lines and one-dot dashed lines, and before or after this, the work W2 gripped by the back spindle 50 is machined by the tool 41 attached to the turret 40 and the tool 61 attached to the tool rest 60 as shown by solid lines and one-dot dashed lines.

Figure 17:
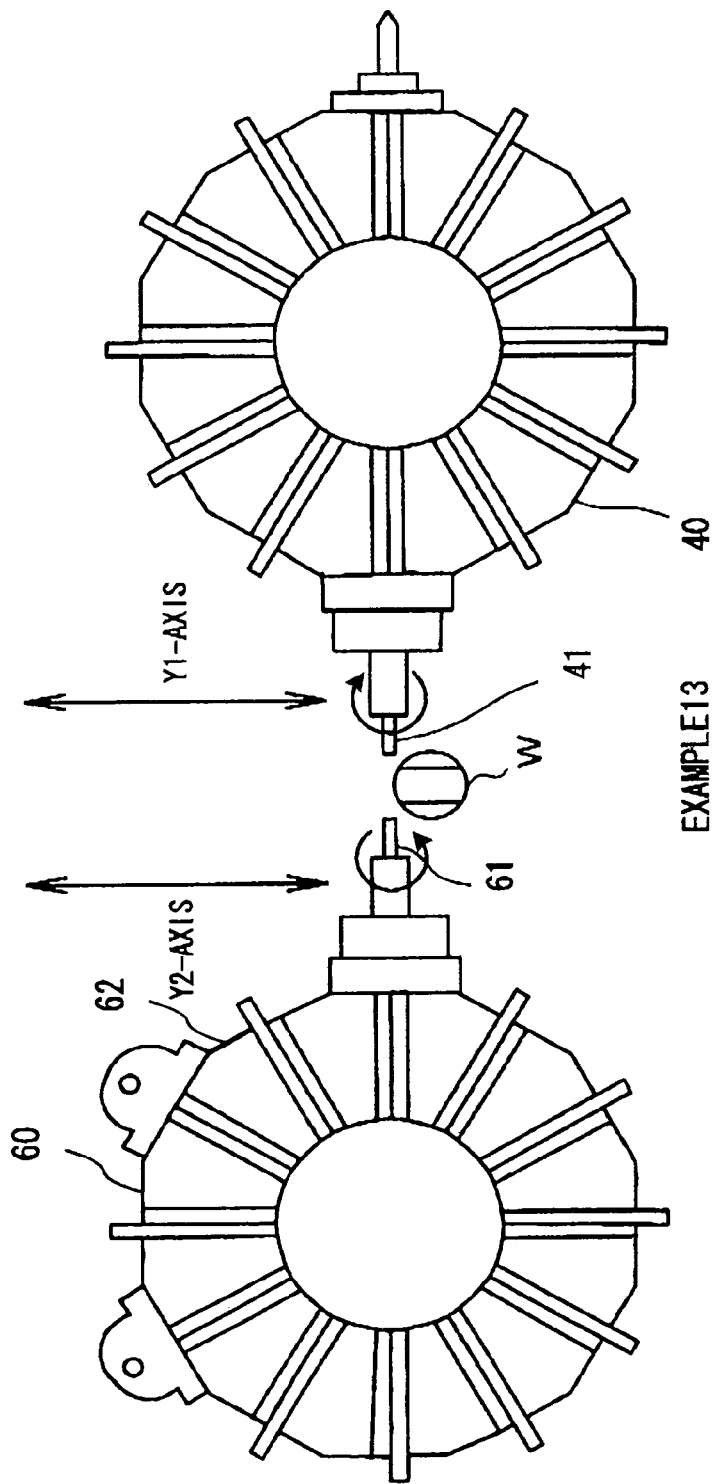
FIG. 17 is an explanatory diagram of a machining example 13.

FIG. 17 is an explanatory diagram of a machining example 13 in which a "wrench application unit" is formed on the work W.

In a case where a "wrench application unit" is formed on the work W, end mills are attached to the turret 40 and to the turret 62 of the tool rest 60. The controller 201 selects these end mills as machining tools 41 and 61 (step S1101), and makes the centerlines of the tools 41 and 61 horizontal (step S1102).

The controller 201 moves the tools 41 and 61 to predetermined positions (step S1103). After this, the controller 201 drives the Y1-axis motor 40E and the Y2-axis motor 63 to move the tools 41 and 61 in the Y1 axis direction and the Y2-axis direction respectively (step S104), Due to this, the both sides of the work W are cut, and a wrench application unit is formed thereon. The controller 201 may repeat the operation of moving the tools 41 and 61 in the Y1-axis direction and Y2-axis direction while moving them in the Z-axis directions (directions perpendicular to the drawing sheet) respectively.

Figure 18:
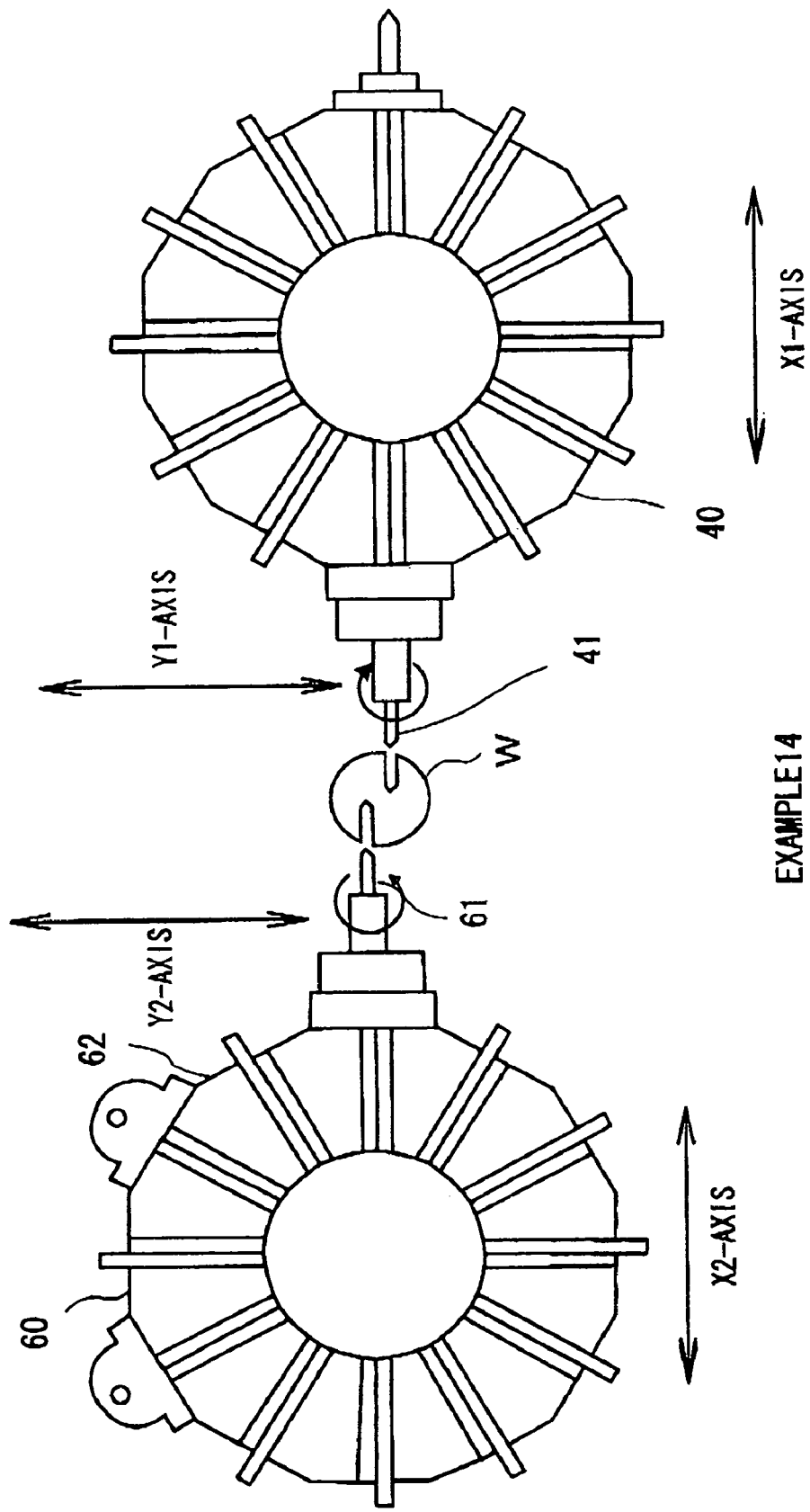
FIG. 18 is an explanatory diagram of a machining example 14.

FIG. 18 is an explanatory diagram of a machining example 14 in which eccentric orifices are formed in two positions of the work W.

In a case where eccentric holes are formed in two positions of the work W, drills are attached to the turret 40 and the turret 62 of the tool rest 60. The controller 201 selects these drills as machining tools 41 and 61 (step S1201), and makes the centerlines of the selected tools 41 and 61 horizontal (step S1202). The controller 201 moves the tools 41 and 61 to predetermined positions in the Z2-axis direction and the Z4-axis direction by driving the Z2-axis motor 17 and the Z4-axis motor 24 (step S1203). Then, the controller 201 drives the Y1-axis motor 40E and the Y2-axis motor 63 to adjusting the tools 41 and 61 to be at predetermined positions in the Y1-axis direction and the Y2-axis direction (step S1204). Next, the controller 201 advances the tools 41 and 61 by driving the X1-axis motor 18 and the X2-axis motor 25 (step S1205). As a result, the work W is bored and two eccentric holes are formed simultaneously.

The lathe according to the present invention has the following effects.

(1) The lathe according to the present embodiment comprises the main spindle 30, the turret 40, the back spindle 50, and the guide bush 90. Accordingly, when the lathe applies machining to a lengthy work W, it prevents the work W from being bent, enabling a highly precise machining. Further, this lathe can apply machining to the end surface of the work W. Furthermore, this lathe can apply machining to both end surfaces of the work W by once cutting off the work W gripped by the main spindle 30, and after this handing the work W gripped by the main spindle 30 to the back spindle 50. Therefore, this lathe can apply machining to works having varied length from short length to long length, entirely without excluding both end surfaces thereof, into complex shapes.

(2) The work W1 gripped by the main spindle 30 and the work W2 gripped by the back spindle 50 can both be machined without the lathe being stopped.

(3) Since the work W1 gripped by the main spindle 30 and the work W2 gripped by the back spindle 50 can be machined by a common tool 41, there is no need of preparing a same kind of tool in a plural number.

(4) Since the lathe comprises the tool magazine 70, it is possible to prepare plural kinds of tools 41 in advance.

(5) Since the lathe comprises the tool exchange mechanism 80, it is possible to exchange tools 41 without stopping the lathe.

(6) The turret 40 can be moved in the Y1-axis direction. Therefore, the position of the tool 41 is movable three-dimensionally, enabling complicated machining such as boring an eccentric hole or an angled hole in the work W, hob machining, etc.

(7) Since the tool rest 60 is provided, a tool to be used next can be prepared at the tool rest 60 while other machining is applied by using, for example, the tool 41 on the turret 40, (8) Since machining can be applied by using the tool 41 and the tool 61 simultaneously, machining time can be shortened.

(9) Since machining can be applied by using the tool 41 and the tool 61 simultaneously, one can be used for rough machining and the other can be used for finishing machining.

(10) Since machining can be applied by using the tool 41 and the tool 61 simultaneously, different portions of the work W can be machined simultaneously.

(11) Since a plurality of tools 41 can be attached to the turret 40, there is no need of stopping the lathe each time the tools 41 are exchanged, resulting in a high machining efficiency.

(12) Since the back spindle 50 is provided with a hole through which the work W penetrates, a further lengthy work W can be attached to the lathe. This eliminates the need of upsizing the lathe.

SECOND EMBODIMENT

Figure 19:
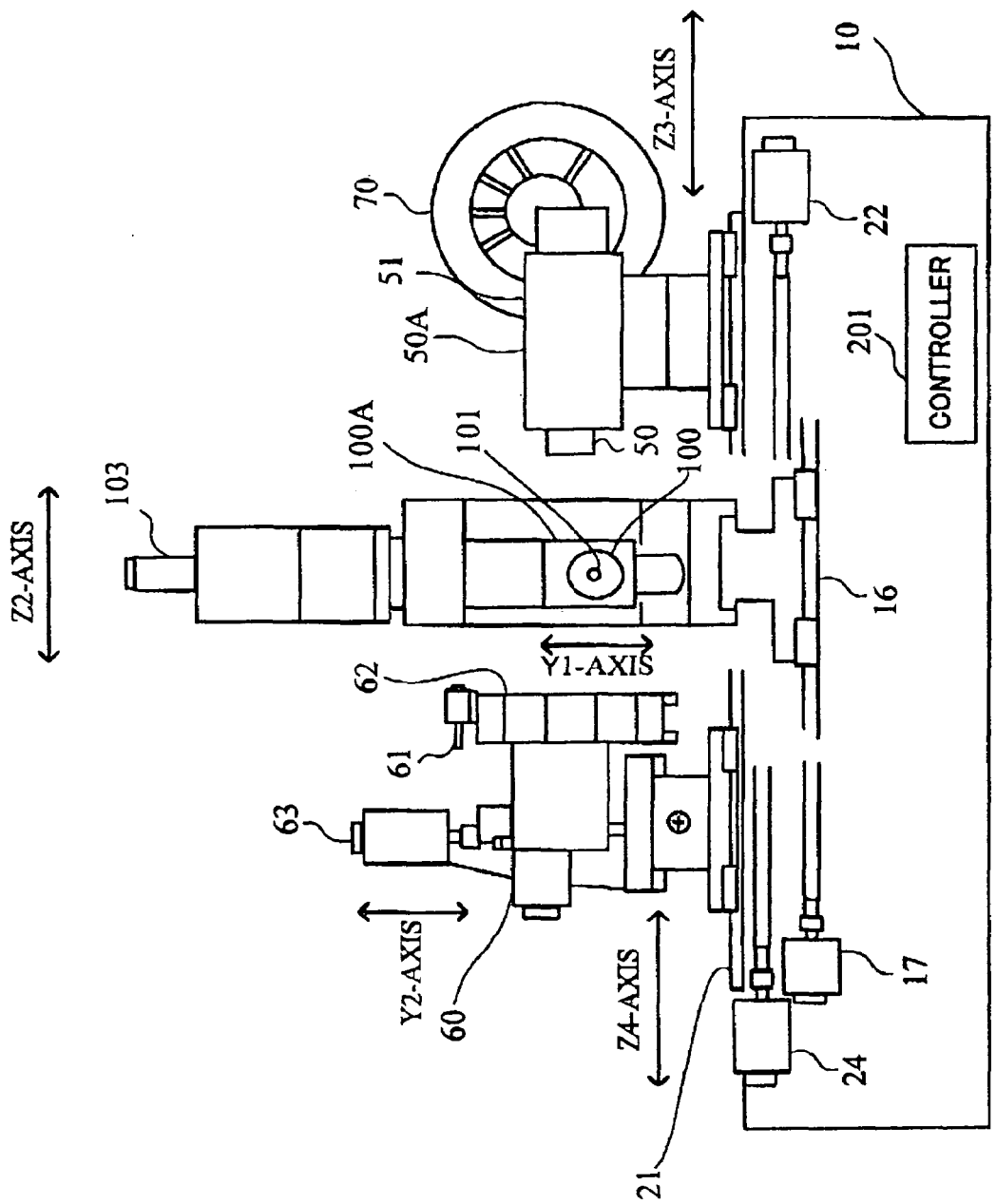
FIG. 19 is a front elevation of a lathe according to a second embodiment of the present invention.
Figure 20:
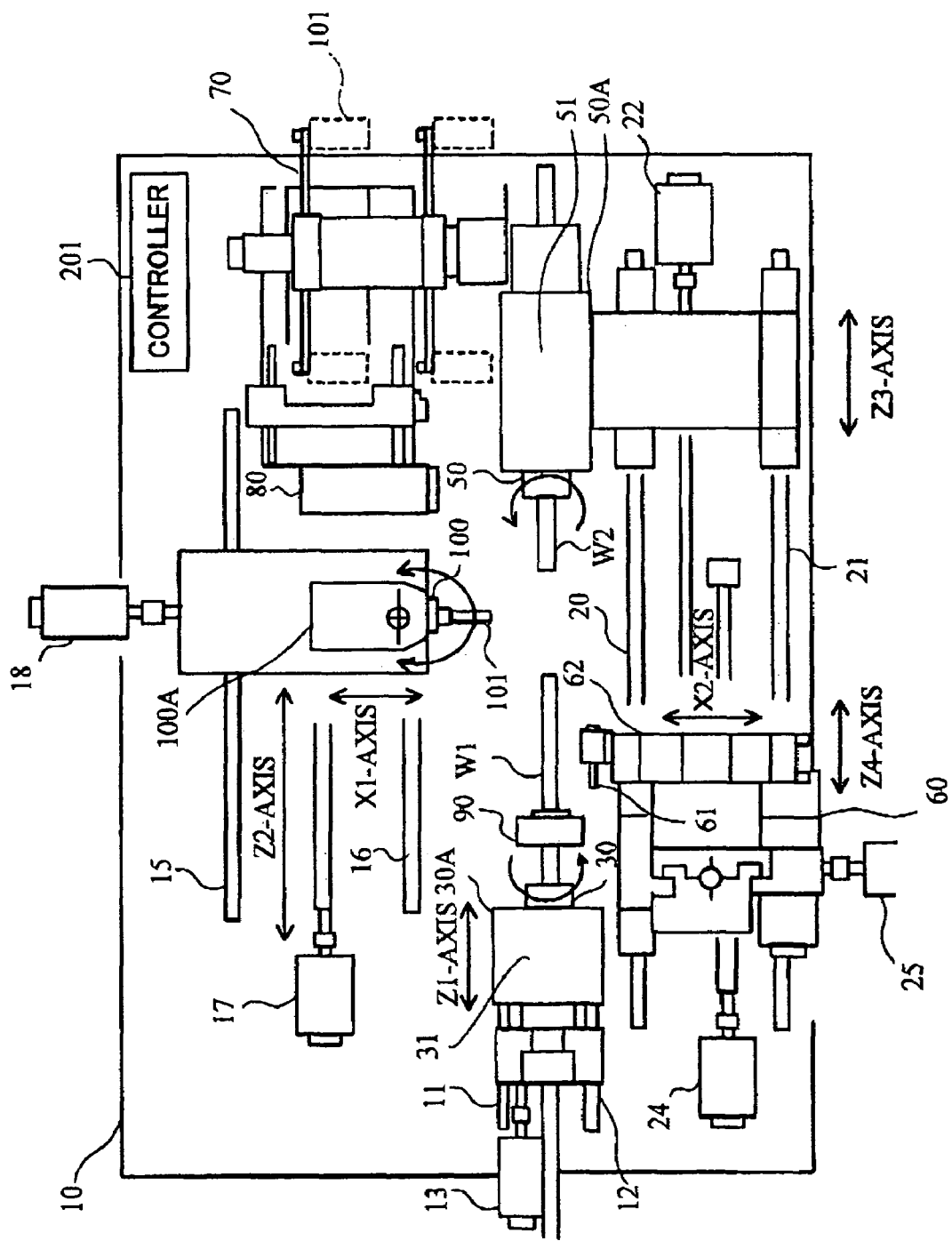
FIG. 20 is a plan view of the lathe.
Figure 21:
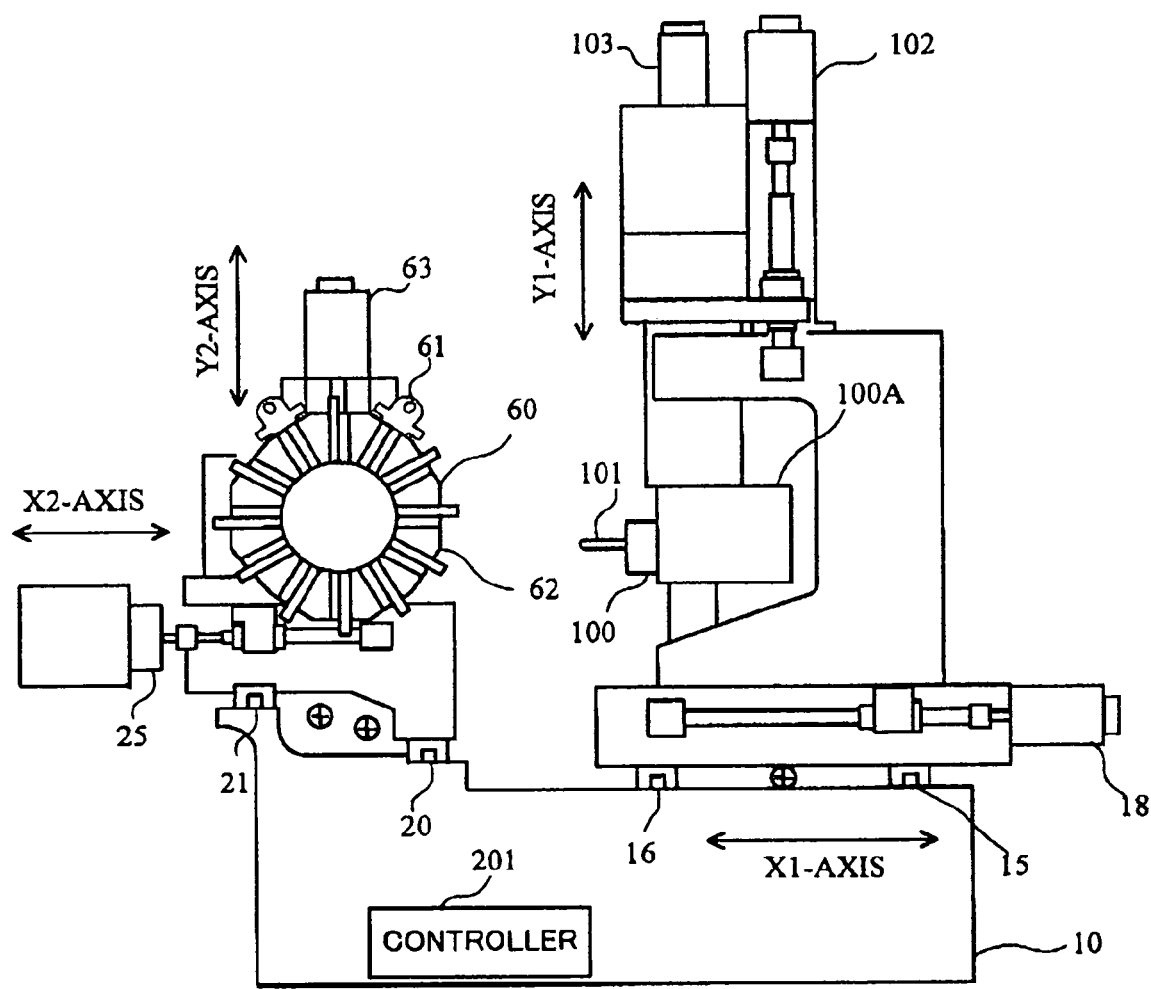
FIG. 21 is a diagram showing an example of configuration of a tool spindle and a tool rest shown in FIG. 19.

FIG. 19 is a front elevation of a lathe according to the second embodiment of the present invention. FIG. 20 is a plan view of the lathe. FIG. 21 is a diagram showing an example of configuration of a tool spindle and a tool rest shown in FIG. 19. In these FIGS. 19 to 21 and FIGS. 22 to 36 to be mentioned later, same reference numerals as those used in the first embodiment are used for same elements as those in the first embodiment.

This lathe is a machine capable of applying complex machining to a work W. As shown in FIG. 19 and FIG. 20, the lathe comprises a bed 10, a main spindle 30 for gripping the work W, a tool spindle 100, a back spindle 50 for gripping the work W, and a controller 201. The controller 201 controls the entire lathe.

A headstock 30A supporting the main spindle 30 is mounted on two rails 11 and 12 which are laid on the bed 10 in parallel with a Z1-axis direction. The rails 11 and 12 are laid on the bed 10 so as to extend in parallel with the Z1-axis direction. The headstock 30A is designed so as to move on the rails 11 and 12 in the Z1-axis direction by driving a Z1-axis motor 13. The headstock 30A has a built-in work rotation motor 31. The work rotation motor 31 rotates the work W gripped by the main spindle 30.

The tool spindle 100 rotatably grips an exchangeable tool 101. The tool spindle 100 is supported by a tool headstock 100A.

The tool headstock 100A is mounted on two rails 15 and 16. The rails 15 and 16 are laid on the bed 10 so as to extend in a Z2-axis direction parallel with the Z1-axis direction. By driving a Z2-axis motor 17, the tool headstock 100A moves on the rails 15 and 16 in the Z2-axis direction.

An X1-axis motor 18 which moves the tool headstock 100A in an X1-axis direction perpendicular to the Z2-axis direction is provided at a side of the tool headstock 100A. A direction change motor 103 and a Y1-axis motor 102 are attached to the upper portion of the tool headstock 100A. The direction change motor 103 changes the direction of a tool 101 by rotating the tool headstock 100A. The Y1-axis motor 102 changes the position of the tool headstock 100A in a Y1-axis direction (direction of height) perpendicular to the Z2-axis direction and the X1-axis direction.

The back spindle 50 grips the work W while being opposed to the main spindle 30. The back spindle 50 is supported by a back headstock 50A. The back headstock 50A is mounted on two rails 20 and 21 laid on the bed 10 in a Z3-axis direction parallel with the Z1-axis direction. The rails 20 and 21 are laid on the bed 10 so as to extend in a Z3-axis direction parallel with the Z1-axis direction. The back headstock 50A is designed so as to move in the Z3-axis direction by driving a Z3-axis motor 22. A work rotation motor 51 is built in the back headstock 50A. The work rotation motor 51 rotates the work W gripped by the back spindle 50.

The main spindle 30 and the back spindle 50 have a hole formed therein, through which the work W penetrates. The lathe further comprises a tool rest 60, a tool magazine 70, a tool exchange mechanism 80, and a guide bush 90.

The tool rest 60 is mounted on rails 20 and 21. The tool rest 60 is designed so as to move in a Z4-axis direction parallel with the Z2-axis direction, by driving a Z4-axis motor 24. An X2-axis motor 25 which moves the tool rest 60 in an X2-axis direction parallel with the X1-axis direction is provided at a side of the tool rest 60.

The tool rest 60 holds a plurality of tools 61 for machining the work W. The tool rest 60 has a turret 62, as shown in FIG. 21. The tools 61 are attached to the turret 62. A tool 61 corresponding to a rotation angle of the turret 62 is selected for machining. A Y2-axis motor 63 is attached to the upper portion of the tool rest 60. The Y2-axis motor 63 changes the position of the tool rest 60 in a Y2-axis direction (direction of height) parallel with the Y1-axis direction.

The guide bush 90 is provided on the main spindle 30 at a side of the back spindle 50. The guide bush 90 slidably supports a portion of the work W that projects from the main spindle 30.

Figure 22:
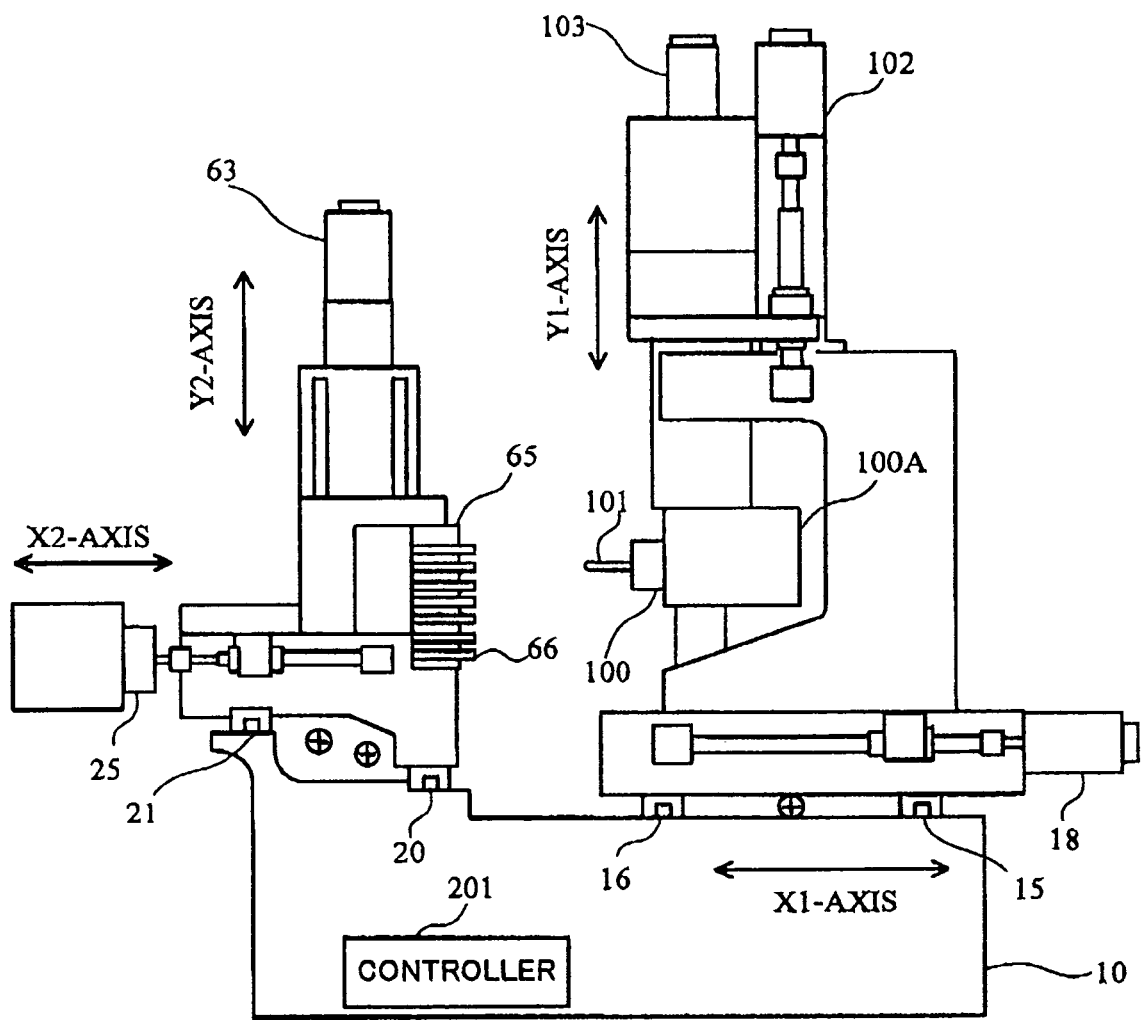
FIG. 22 is a diagram showing an example of modification of the tool rest.

In the present embodiment, the tool rest 60 has the turret 62. However, the present invention is not limited to this, but a plurality of tools 66 may be arrayed in a support member 65 in a gang arrangement, as shown in FIG. 22. FIG. 22 is a diagram showing a modified example of the tool rest.

The tool magazine 70 contains a necessary number of tools 101 to be attached to the tool spindle 100. The tool exchange mechanism 80 comprises a mechanism for exchanging an arbitrary one of a plurality of tools 101 attached to the tool spindle 100, with any of the tools 101 contained in the tool magazine 70.

Next, the operation of the lathe will be explained along with explanation of examples of machining.

Figure 23:
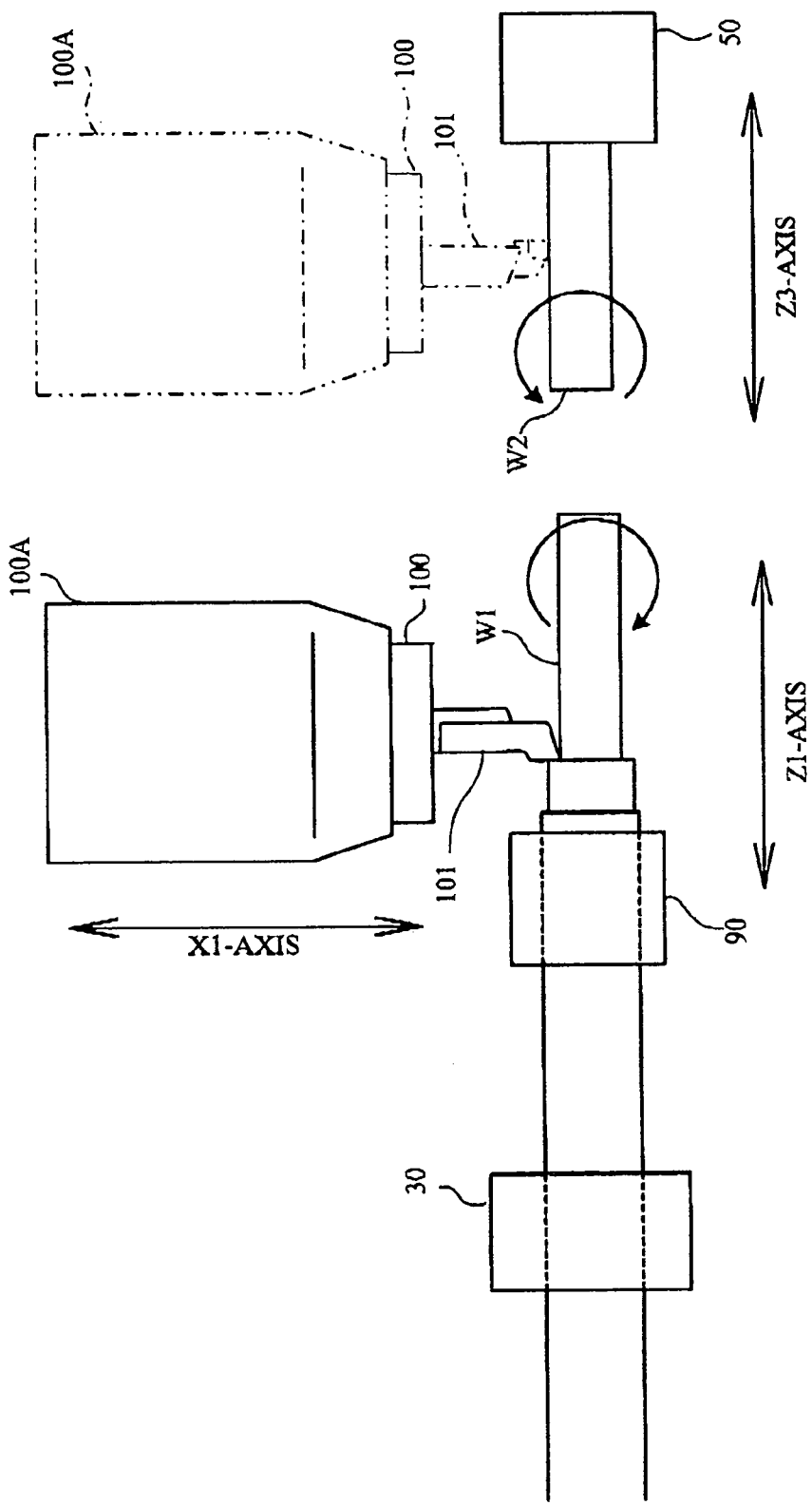
FIG. 23 is an explanatory diagram of a machining example 15.

FIG. 23 is an explanatory diagram of a machining example 15 in which outer diameter machining is applied to both of a work W1 gripped by the main spindle 30 and a work W2 gripped by the back spindle 50.

In this case, the main spindle 30 grips the work W1 and the back spindle 50 grips the work W2.

Next, the controller 201 positions the portion to be machined of the work W1 gripped by the main spindle 30 in front of the tool spindle 100, by driving the Z1-axis motor 13 and the Z2-axis motor 17 (step S1301).

The controller 201 drives the Z1-axis motor 13 and the X1-axis motor 18 while rotating the work W1 by driving the work rotation motor 31 (step S1302). As a result, the tool 101 abuts on the work W1, thereby machining the outer circumference of the work W1 gripped by the main spindle 30. The controller 201 retreats the tool spindle 100 by driving the X1-axis motor 18, after machining of the work W1 is finished (step S1303).

Then, the controller 201 rotates the tool 101 of the tool spindle 100 by 180° (step S1304). Then, by driving the Z3-axis motor 22 and the Z2-axis motor 17, the controller 201 positions the portion to be machined of the work W2 gripped by the back spindle 50 in front of the tool spindle 100 (step S1305). Next, the controller 201 rotates the work W2 by driving the work rotation motor 51 (step S1306), and drives and controls the Z3-axis motor 22 and the X1-axis motor 18 (step S1307). As a result, the tool 101 abuts on the work W2, thereby machining the outer circumference of the work W2 gripped by the back spindle 50.

The controller 201 applies various machining to the work W1 and the work W2 by appropriately managing the kinds of tools 11, the Z1-axis motor 13, the Z2-axis motor 17, the Z3-axis motor 22, and the X1-axis motor 18. For example, the work W1 and the work W2 are machined to have a linear outer circumference, or to have a tapered shape, or to have an outer circumference having a desired shape such as a circular arc shape, etc.

Figure 24:
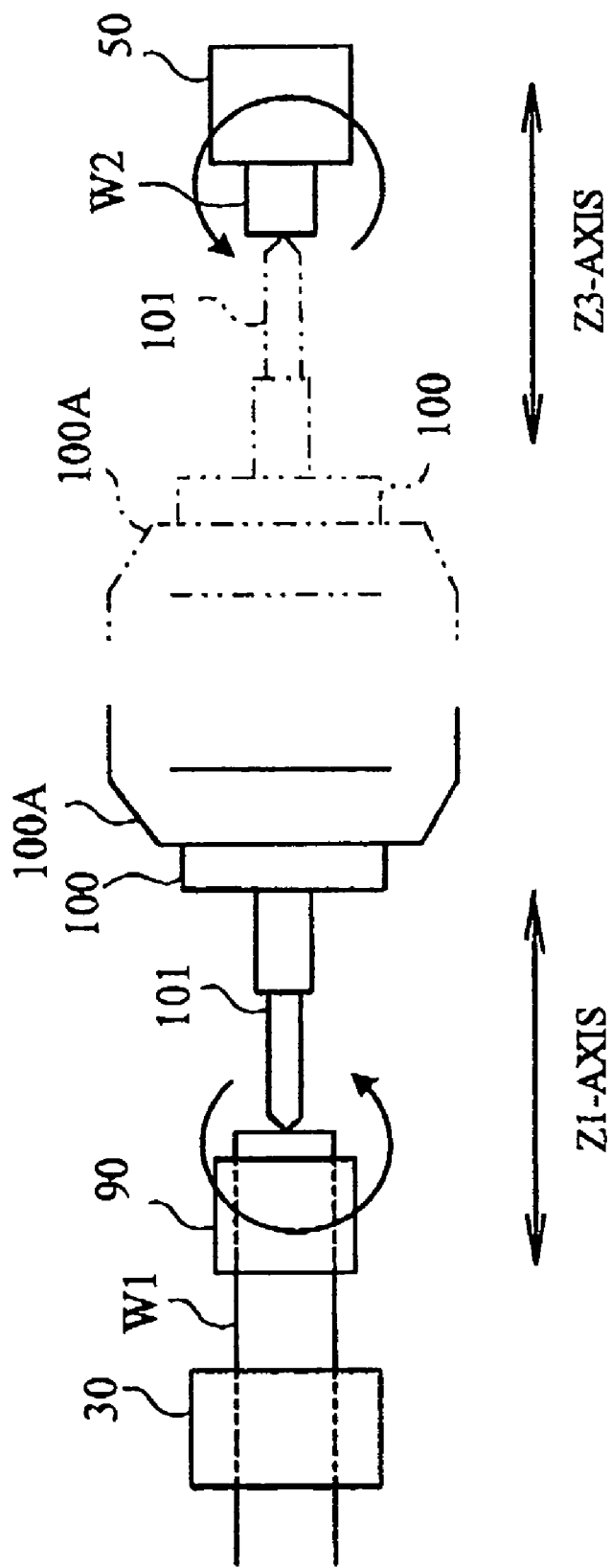
FIG. 24 is an explanatory diagram of a machining example 16.

FIG. 24 is an explanatory diagram of a machining example 16 in which a hole is drilled in the end surface of both of the work W1 gripped by the main spindle 30 and the work W2 gripped by the back spindle 50.

In this case, the tool 101 to be attached to the tool spindle 100 is a drill.

The controller 201 drives the X1-axis motor 18 and the direction change motor 103 to control the tip of the tool 101 to face the end surface of the work W1 gripped by the main spindle 30 (step S1401). Next, while rotating the work W1 by driving the work rotation motor 31, the controller 201 drives the Z1-axis motor 13 so that the tip of the tool 101 advances toward the main spindle 30 (step S1402). Due to this, the tool 101 drills the end surface of the work W1, thereby drilling a hole in the end surface of the work W1.

After machining of the work W1 at the side of the main spindle 30 is finished, the controller 201 drives the X1-axis motor 18 to retreat the tool spindle 100 (step S1403). Then, the controller 201 drives the direction change motor 103 to control the tip of the tool 101 to face the end surface of the work W2 gripped by the back spindle 50 (step S1404). Then, while rotating the work W2 by driving the work rotation motor 51, the controller 201 drives the Z3-axis motor 22 so that the tip of the tool 101 advances toward the back spindle 50 (step S1405). Due to this, the tool 101 abuts on the end surface of the work W2 to drill the end surface, thereby drilling a hole in the work W2.

The above explanation shows the outline of the case where hole drilling machining is applied to the end surface of both of the work W1 gripped by the main spindle 30 and the work W2 gripped by the back spindle 50. However, a hole can be drilled in both end surfaces of one work W.

In this case, the controller 201 first causes the work W to be gripped by the main spindle 30 (step S1401). Next, the controller 201 controls the tool 101 to drill a hole in one end surface of the work W (step S1402). When hole drilling is finished, the controller 201 drives the X1-axis motor 18 to retreat the tool spindle 100, and drives the Z3-axis motor 22 to move the back spindle 50 toward the main spindle 30 so that the end portion of the work W is gripped by the back spindle 50 (step S1403). After this, the controller 201 controls the main spindle 30 to release the work W (step S1404). Next, the controller 201 drives the Z3-axis motor 22 to move the back spindle 50 to a predetermined position (step S1405), and drives the X1-axis motor 18 to return the tool spindle 100 to the machining position (step S1406). After this, the tool 101 drills a hole in the other end surface of the work W in the same way as described above (step S1407).

Figure 25:
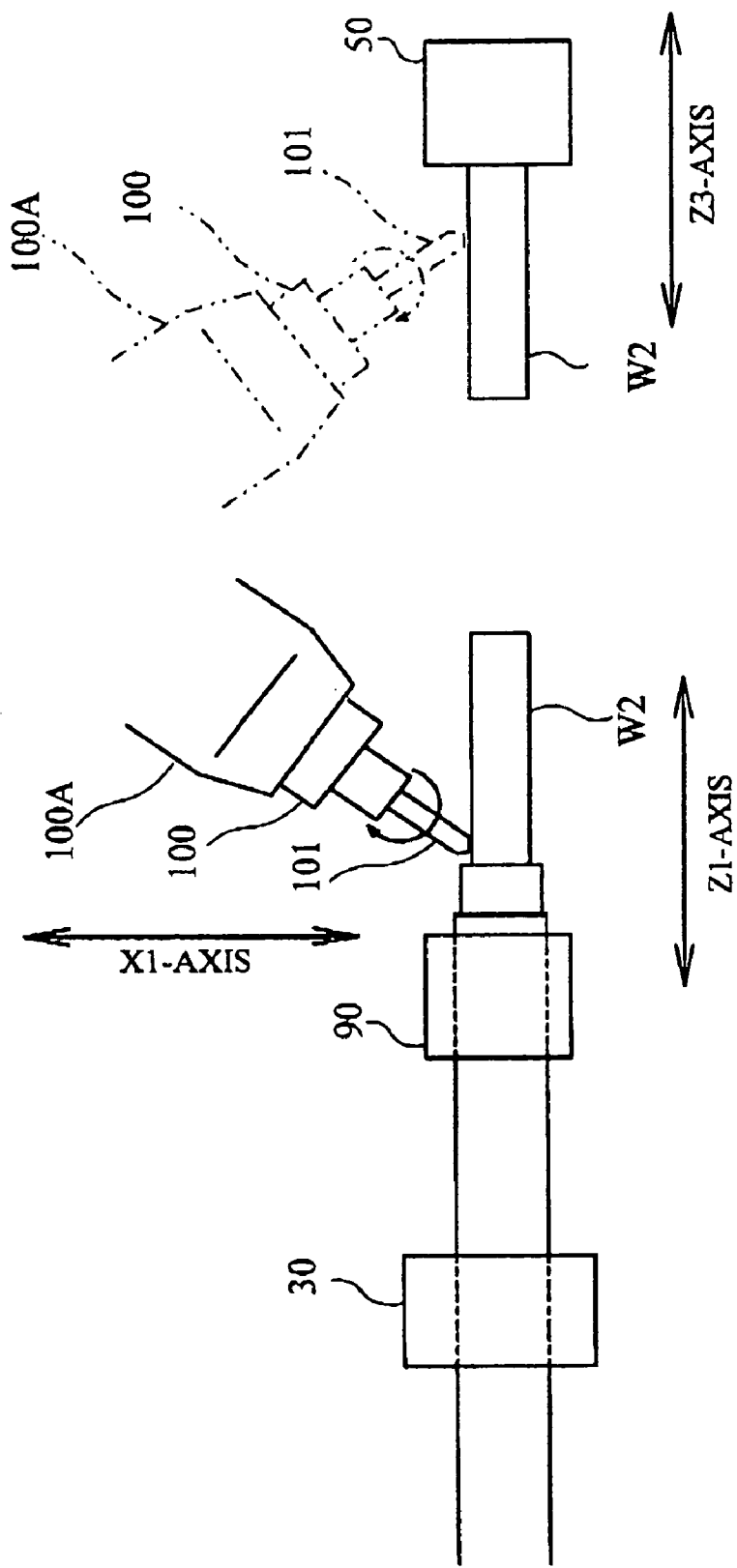
FIG. 25 is an explanatory diagram of a machining example 17.

FIG. 25 is an explanatory diagram of a machining example 17 in which an "angled hole" is formed in the work.

In this case, the tool 101 to be attached to the tool spindle 100 is a drill.

Before the work W1 gripped by the main spindle 30 is machined, the controller 201 drives the direction change motor 103 to control the tool 101 to be at a desired angle to the axis of the work W1 gripped by the main spindle 30 (step S1501).

Next, the controller 201 drives the Z1-axis motor 13 or the Z2-axis motor 17 to adjust the relative positions of the work W1 and the tool 101 with respect to each other (step S1502). After this, while rotating the tool 101, the controller 201 simultaneously drives the Z1-axis motor 13 and the X1-axis motor 18 to relatively move the work W1 and the tool 101 in a manner that the tip of the tool 101 enters the work W1 at the desired angle to the axis of the work W1 (step S1503). Due to this, an angled hole is drilled in the work W1 gripped by the main spindle 30.

In a case where an angled hole is drilled in the work W2 gripped by the back spindle 50, the controller 201 controls the direction change motor 103 in a manner that the tool 101 is at a desired angle to the axis of the work W2 (step S1504). Next, the controller 201 drives the Z3-axis motor 22 or the Z2-axis motor 17 to adjust the relative positions of the tool 101 and the work W2 with respect to each other (step S1505). After this, while rotating the tool 101, the controller 201 synchronously drives the Z3-axis motor 22 and the X1-axis motor 18 to relatively move the work W2 and the tool 101 in a manner that the tip of the tool 101 enters the work W2 at the desired angle (step S1506). Due to this, an angled hole is drilled in the work W2.

Figure 26:
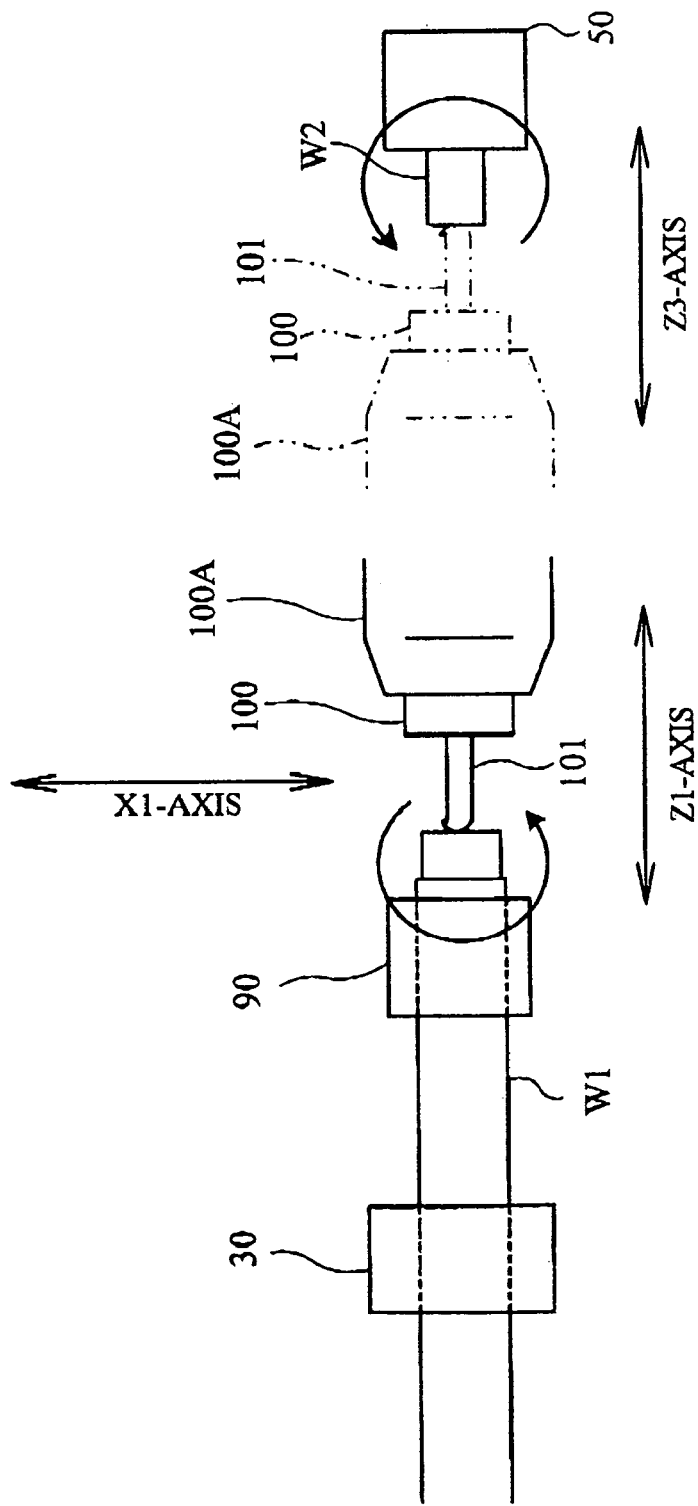
FIG. 26 is an explanatory diagram of a machining example 18.

FIG. 26 is an explanatory diagram of a machining example 18 in which a hole having a desired diameter is formed in the work W (inner diameter machining is applied to the work W).

In a case where inner diameter machining is applied to the work W1 gripped by the main spindle 30 and the work W2 gripped by the back spindle 50, the controller 201 performs the same process as applying hole drilling machining to an end surface, with an inner diameter machining tool attached to the tool spindle 100 as the tool 101. That is, the controller 201 controls the X1-axis motor 18 and the direction change motor 103 such that the tool 101 and the work W1 gripped by the main spindle 30 becomes coaxial and the tip of the tool 101 faces the end surface of the work W 1 gripped by the main spindle 30 (step S1601). Next, the controller 201 drives the Z1-axis motor 13 or the Z2-axis motor 17 to move the tip of the tool 101 toward the main spindle 30 while rotating the work W1 by driving the work rotation motor 31 (step S1602). The controller 201 controls the Z1-axis motor 13 and the X1-axis motor 18 to move the tool 101 in the Z1-axis direction and the X1-axis direction and form a hole in the end surface of the work W1 by cutting the work W1, and adjusts the diameter and the depth of the hole (step S1603).

After machining of the work W2 is finished, the controller 201 drives the X1-axis motor 18 to retreat the tool spindle 100 (step S1604).

Subsequently, the controller 201 drives the direction change motor 103 to rotate the tool spindle 100 by 180° so that the tip of the tool 101 faces the end surface of the work W2 gripped by the back spindle 50 (step S1605). Then, the controller 201 drives the work rotation motor 51 to rotate the work W2 and drives the Z3-axis motor 22 or the Z2-axis motor 17 to relatively move the tip of the tool 101 toward the back spindle 50 (step S1606). Then, by controlling the Z3-axis motor 22 and the X1-axis motor 18, the controller 201 moves the tool 101 in the Z3-axis direction and the X1-axis direction to form a hole in the work W2, and adjusts the depth, diameter, and position of the hole (step S1607).

Figure 27:
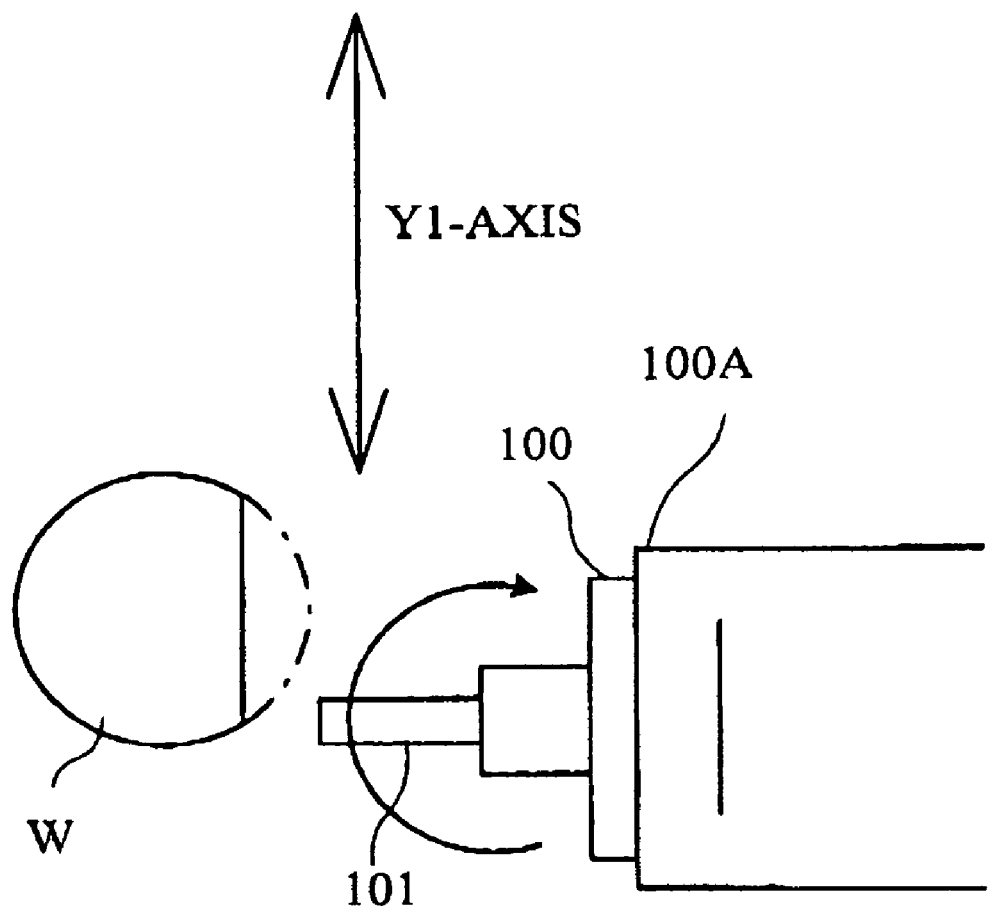
FIG. 27 is an explanatory diagram of a machining example 19.

FIG. 27 is an explanatory diagram of a machining example 19 in which the work W is cut linearly.

In a case where a portion of the work W is cut to form the cross section of the work W into a D character shape, an end mill is attached to the tool spindle 100 as the tool 101. The controller 201 moves the tool spindle 100 to a predetermined position (step S1701). After this, the controller 201 drives the Y1-axis motor 102 to move the end mill in the Y1-axis direction while rotating the tool 101 (step S1702). In accordance with necessity, the controller 201 moves the tool spindle 100 in the Z2-axis direction (the direction of axis of the work W) (step S1703). Due to this, the work W is cut and the cross section of the work W becomes a D character shape.

Figure 28:
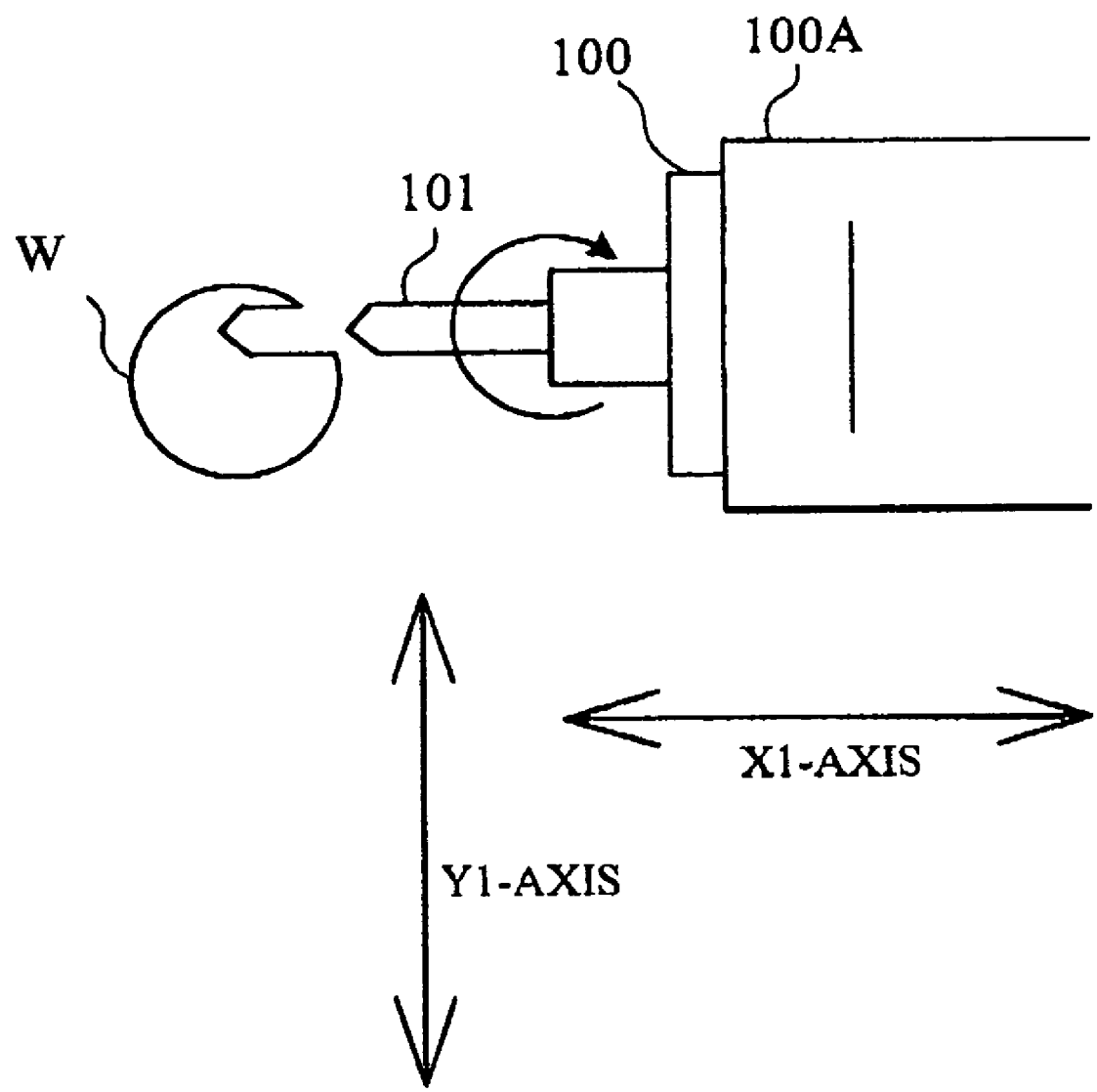
FIG. 28 is an explanatory diagram of a machining example 20.

FIG. 28 is an explanatory diagram of a machining example 20 in which an eccentric hole is formed in the work W.

In a case where a hole (eccentric hole) is formed in a position decentered from the center axis of the work W, a drill is attached to the tool spindle 100 as the tool 101. The controller 201 drives the Z2-axis motor 17 to move the tool spindle 100 to a predetermined position (step S1801). Then, the controller 201 drives the Y 1-axis motor 102 to make the height of the tool 101 differ from the height of the center of the work W (step S1802). Then, while rotating the tool 101, the controller 201 drives the X1-axis motor 18 to advance the tool 101 and form a hole in the work W (step S1803). Due to this, an eccentric hole is formed in the work W.

Figure 29B:
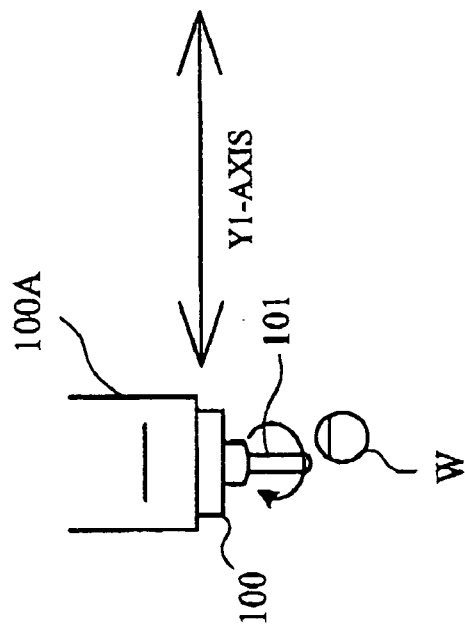
FIG. 29 are explanatory diagrams of a machining example 21.
Figure 29A:
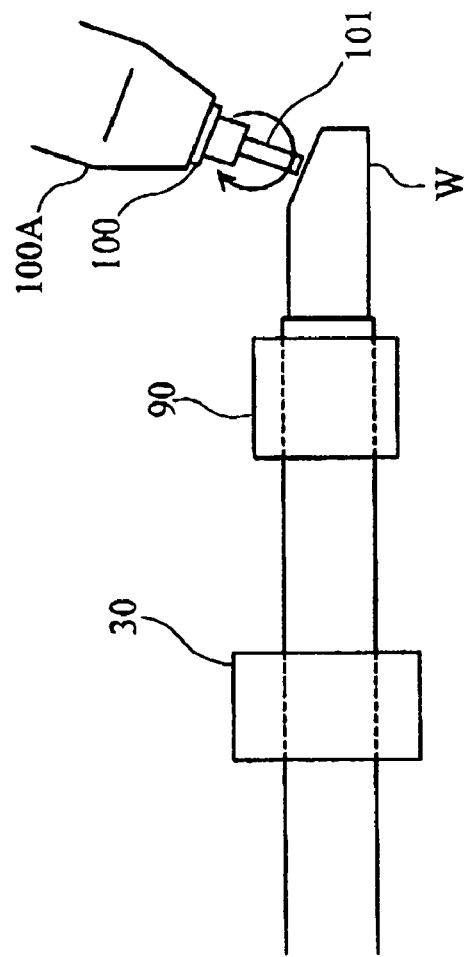

FIGS. 29A and 29B are explanatory diagrams of a machining example 21 in which the end portion of the work is obliquely cut, where FIG. 29A shows a front elevation and FIG. 29B shows a side elevation.

In a case where the end portion of the work W is obliquely cut, an end mill is attached to the tool spindle 100 as the tool 101. The controller 201 drives the direction change motor 103 such that the tool 101 is at a desired angle to the axis of the work W gripped by the main spindle 30 (step S1901). Then, the controller 201 drives the Y1-axis motor 102 to move the tool 101 in the Y1-axis direction (step S1902). Due to this, the tool 101 obliquely abuts on the end portion of the work W, thereby cutting the end portion of the work W obliquely. In accordance with necessity, the controller 201 moves the tool spindle 100 and the work W relatively in the X-axis direction and Z-axis direction.

FIGS. 30A and 30B are explanatory diagrams of a machining example 22 in which hob machining is applied to the work W, where FIG. 30A shows a front elevation and FIG. 30B shows a side elevation.

In a case where hob machining for forming a toothed gear is applied, a hob is attached to the tool spindle 100 as the tool 101. The controller 201 moves the tool spindle 100 to a predetermined position (step S2001). Then, the controller 201 drives the direction change motor 103 to make the tool 101 to be at a predetermined angle (step S2002).

The controller 201 controls the rotation of the tool 101 and the rotation of the work W to be synchronous with each other at a predetermined speed ratio, and advances the work W by driving the Z1-axis motor 13 (step S2003). Due to this, the work W moves while being cut by the tool 101, and a toothed gear is formed on the work W.

FIG. 31 is an explanatory diagram of a machining example 23 in which outer diameter machining is applied to the work W using the tool 101 and the tool 61.

In a case where outer diameter machining is applied to the work W by using the tool 101 attached to the tool spindle 100 and the tool 61 attached to the tool rest 60, an outer diameter machining tool is attached to the tool spindle 100 as the tool 101 and an outer diameter machining tool is selected as the tool 61.

The controller 201 controls the main spindle 30, the back spindle 50, and the tool spindle 100, in the same manner as for applying outer diameter machining to the work W using only the tool 101.

The controller 201 controls the tool rest 60 such that the turret 62 rotates and the selected tool 61 faces the outer circumferential surface of the work W, and drives the X2-axis motor 25 such that the tool 61 cuts the outer circumference of the work W. The tool 101 and the tool 61 cut the work W while being opposed to each other with the work W positioned therebetween. Accordingly, the work W is prevented from being fluctuated and a highly precise machining can be applied thereto. Further, since the outer diameter of the work W is machined by the two tools 101 and 61 simultaneously, the total machining time can be shortened.

Figure 32:
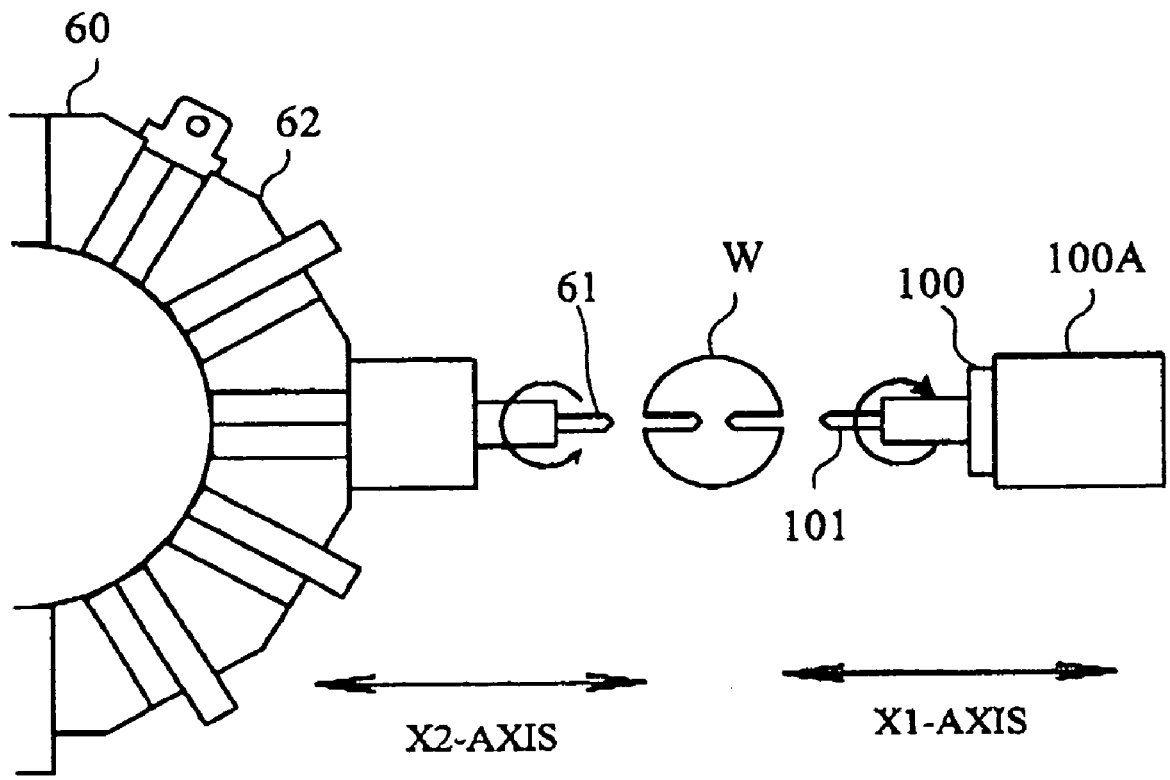
FIG. 32 is an explanatory diagram of a machining example 24.

FIG. 32 is an explanatory diagram of a machining tool 24 in which hole drilling machining is applied to the work W.

In a case where hole drilling machining is applied to the work W, a drill is attached to the tool spindle 100 as the tool 101, and a drill is selected as the tool 61 of the tool rest 60. The controller 201 rotates the turret 62 to make the selected tool 61 face the work W (step S2011). Then, the controller 201 drives the Z2-axis motor 17 and the Z4-axis motor 24 to move the tool 101 and the tool 61 to predetermined positions (step S2012). After this, while rotating the tool 101 and the tool 61, the controller 201 drives the X1-axis motor 18 and the X2-axis motor 25 to advance the tool 101 and the tool 61 toward the work W so that the work W is cut by the tool 101 and the tool 61 (step S2013). Due to this, holes are symmetrically formed in the work W. The tool 101 and the tool 61 cut the work W while being opposed to each other with the work W positioned therebetween. Accordingly, the work W is prevented from being fluctuated, and a highly precise machining is available. Further, since the work W is machined by the two tools 101 ad 61 simultaneously, the total machining time can be shorter than a case where machining is applied by using only the tool 101.

Figure 33:
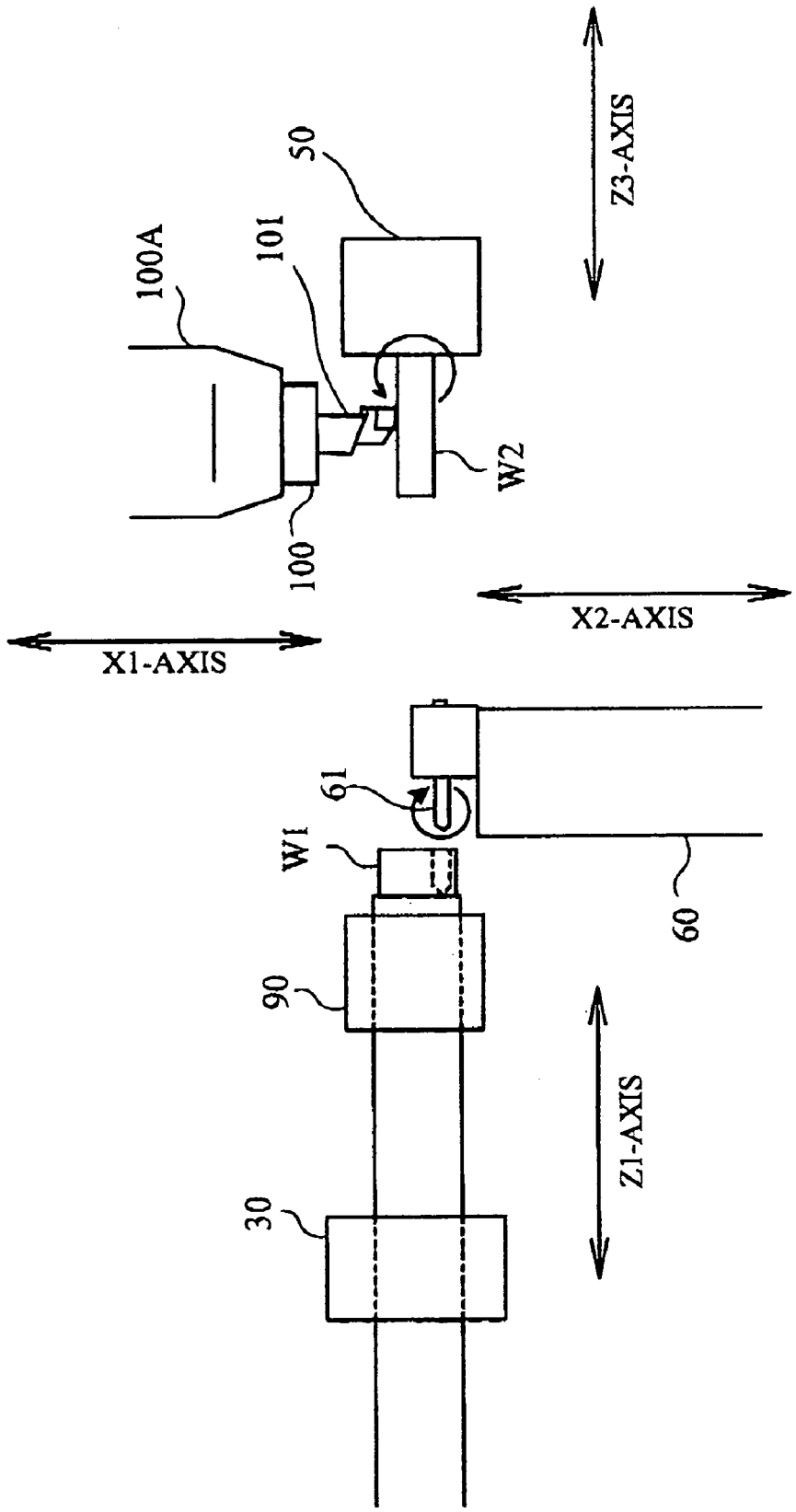
FIG. 33 is an explanatory diagram of a machining example 25.

FIG. 33 is an explanatory diagram of a machining example 25 in which two works W 1 and W2 are machined simultaneously.

For example, in a case where machining for forming an eccentric hole is applied to the end surface of the work W1 gripped by the main spindle 30 and outer diameter machining is applied to the work W2 gripped by the back spindle 50, an outer diameter machining tool is attached to the tool spindle 100 as the tool 101.

The controller 201 drives the X1-axis motor 18 to advance the tool 101 to a predetermined position (step S2101). The controller 201 rotates the turret 62 to select a drill as the tool 61 of the tool rest 60 (step S2102). Next, the controller 201 drives the X2-axis motor 25 to adjust the selected tool 61 such that its tip faces the portion of the work W1 that is to be machined (step S2103). Then, while rotating the tool 61, the controller 201 drives the Z1-axis motor 13 to advance the work W1 gripped by the main spindle 30 (step S2104).

Along with this process, the controller 201 rotates the work W2 by driving the work rotation motor 51 and drives the Z3-axis motor 22 to advance the work W2 gripped by the back spindle 50 (step S2105). Due to this, an eccentric hole is formed in the end surface of the work W1 and the outer circumferential surface of the work W2 is cut.

Figure 34:
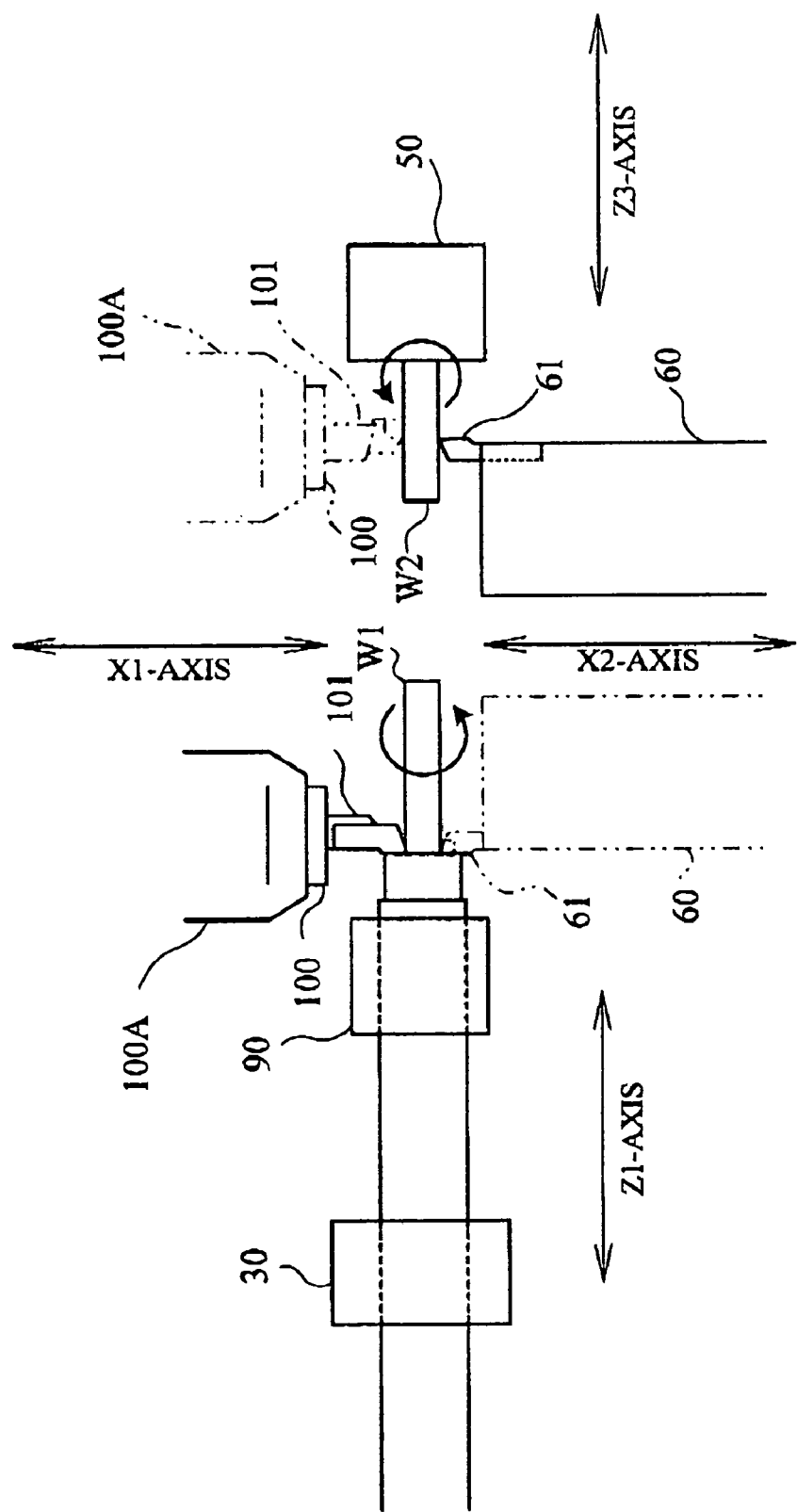
FIG. 34 is an explanatory diagram of a machining example 26.

FIG. 34 is an explanatory diagram of a machining example 26 in which the two works W1 and W2 are machined simultaneously.

For example, in a case where outer diameter machining is applied to the work W2 gripped by the main spindle 30 and the work W2 gripped by the back spindle 50, the tool 101 attached to the tool spindle 100 and the tool 61 attached to the tool rest 61 may simultaneously apply machining to one work W, or the tool 101 and the tool 61 may independently apply machining to the work W1 and the work W2 respectively.

Figure 35:
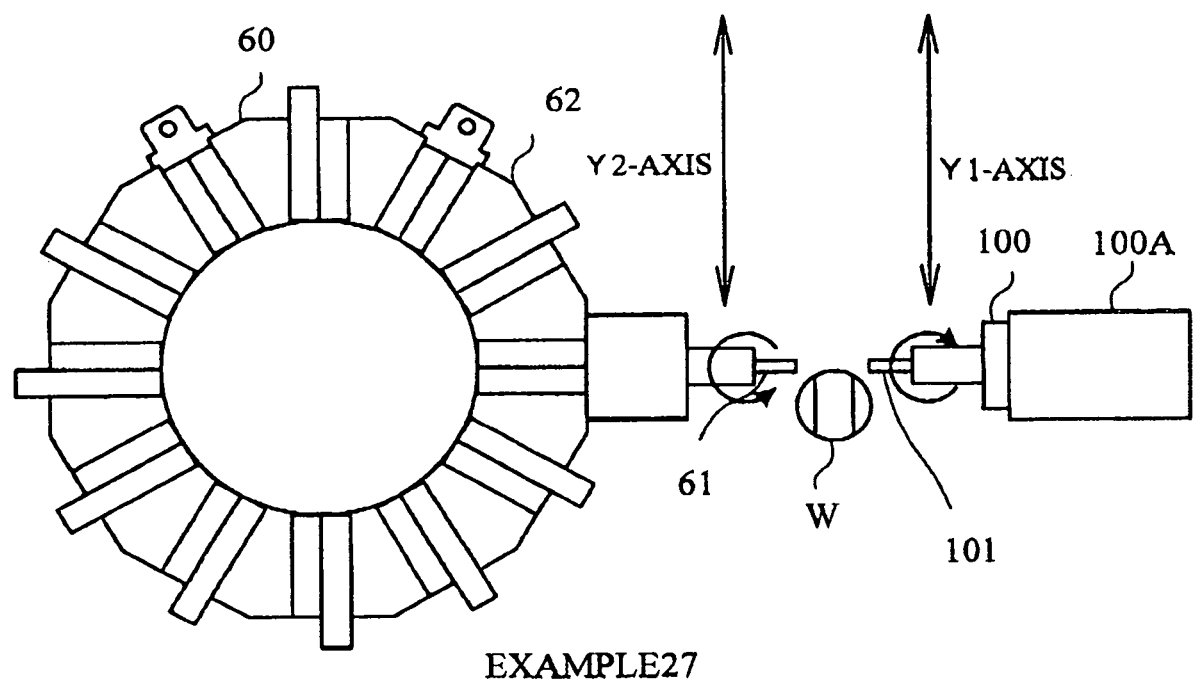
FIG. 35 is an explanatory diagram of a machining example 27.

FIG. 35 is an explanatory diagram of a machining example 27 in which a wrench application unit is formed on the work W.

In a case where a wrench application unit is formed on the work W, an end mill is attached to the tool spindle 100 as the tool 101. The controller 201 selects an end mill as the tool 61 of the tool rest 60 (step S2201). After this, the controller 201 moves the tools 101 and 61 to predetermined positions, and drives the Y1-axis motor 102 and the Y2-axis motor 63 to move the tool 101 and the tool 61 in the Y1-axis direction and the Y2-axis direction respectively (step S2202). Due to this, the both sides of the work W are cut and a wrench application unit is formed.

Figure 36:
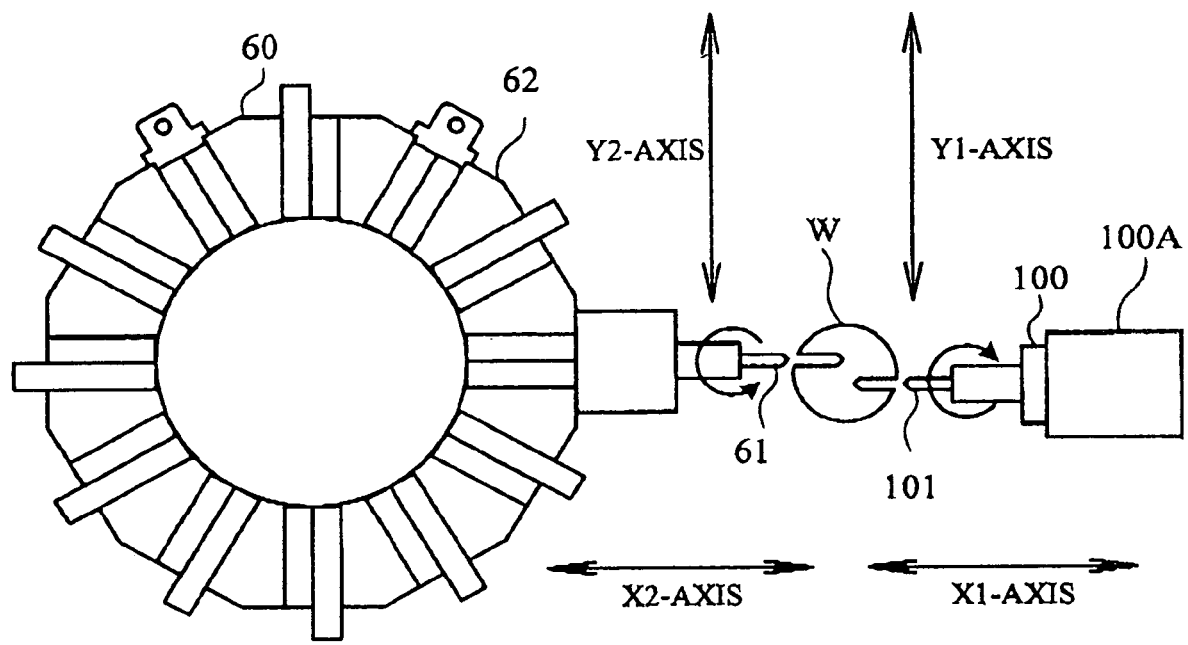
FIG. 36 is an explanatory diagram of a machining example 28.

FIG. 36 is an explanatory diagram of a machining example 28 in which eccentric holes are formed in the work W.

In a case where eccentric holes are formed in two portions of the work W, a drill is attached to the tool spindle 100 as the tool 101. The controller 201 selects a drill as the tool 61 of the tool rest 60. The controller 201 moves the tool 101 and the tool 61 to predetermined positions in the Z2-axis direction and the Z4-axis direction. After this, the controller 201 drives the Y1-axis motor 102 and the Y2-axis motor 63 to adjust the tool 101 and the tool 61 to be at predetermined positions in the Y1-axis direction and the Y2-axis direction. Next, the controller 201 advances the tool 101 and the tool 61 by driving the X1-axis motor 18 and the X2-axis motor 25. Due to this, hole drilling machining is applied to the work W and two eccentric holes are simultaneously formed.

As described above, the lathe according to the present embodiment has the following operation effects.

(1) Since the lathe comprises the main spindle 30, the tool spindle 100, the back spindle 50, and the guide bush 90, even when a lengthy work W is machined, it can be prevented from being bent. Accordingly, highly precise machining is available. Further, an end surface of the work W can be machined. Furthermore, both end surfaces of the work W can be machined by machining the work W gripped by the main spindle 30, and after this machining is finished, by machining the work W by moving the work W from the main spindle 30 to the back spindle 50. Therefore, it is possible to machine works W having varied lengths from a short length to a long length, entirely without excluding both end surfaces thereof, into complex shapes.

(2) It is possible to machine the work W1 gripped by the main spindle 30 and the work W2 gripped by the back spindle 50 without stopping the lathe.

(3) The tool spindle 100 grips one tool 101. Accordingly, unlike the turret 40 in the first embodiment, no interference occurs between adjacent tools 41.

(4) The work W2 gripped by the main spindle 30 and the work W2 gripped by the back spindle 50 can be both machined by the same tool 101. Therefore, there is no need of preparing a same kind of tool 101 in a plural number.

(5) The lathe comprises the tool magazine 70. Accordingly, it is possible to prepare plural kinds of tools 101 in advance.

(6) The lathe comprises the tool exchange mechanism 80. Accordingly, it is possible to exchange the tools 101 without stopping the lathe.

(7) The lathe can move the tool spindle 100 in the Y1-axis direction. Accordingly, it is possible to freely move the tool 101 three-dimensionally. Therefore, complex machining such as machining for drilling an eccentric hole in the work W, machining for forming an angled hole, hob machining, etc. becomes available.

(8) The lathe comprises the tool rest 60. Therefore, the lathe can prepare a tool to be used next on the tool rest 60, while, for example, applying machining by using the tool 101 on the tool spindle 100. Crosswise, the lathe can prepare a tool to be used next on the tool spindle 100, while, for example, applying machining by using the tool 61 on the tool rest 60. This shortens the idle time for exchanging tools.

(9) The lathe can apply machining to the work W by simultaneously using the tool 101 and the tool 61. Accordingly, the machining time can be shortened.

(10) Since machining can be applied by simultaneously using the tool 101 and the tool 61, one can be used for rough machining and the other can be used for finishing machining.

(11) Since machining can be applied by simultaneously using the tool 101 and the tool 61, different portions of the work W can be machined simultaneously.

(12) Since the back spindle 50 has a hole formed therein, through which the work W penetrates, a lengthy work W can be attached thereto. Due to this, there is no need of upsizing the lathe.

The present invention is not limited to the above-described embodiments, but may be variously modified. Modified examples include the followings.

(i) According to the above-described embodiments, the X1- and X2-axis directions, the Z1-, Z2-, Z3-, and Z4-axis directions, and the Y1- and Y2-axis directions are perpendicular to one another. However, they may not be perpendicular to each other as long as they are different directions.

(ii) According to the above-described embodiments, the X1-axis direction and the X2-axis direction are parallel with each other, and the Y1-axis direction and the Y2-axis direction are parallel with each other, However, they may not be parallel, For example, the turret 40 or the tool spindle 100 may be structured to obliquely fall from an upper position to a lower position to move the tool 41 or the tool 101 forward. Furthermore, symmetrically with the turret 40 or the tool spindle 100, the tool rest 60 may be structured to obliquely fall from an upper position to a lower position to move the tool 61 forward.

(iii) Machining may be applied to the work W by fixing the position of the turret 40, the tool spindle 100, or the tool rest 60 and moving the main spindle 30 or the back spindle 50. Crosswise, machining may be applied to the work W by fixing the position of the main spindle 30 or the back spindle 50 and moving the turret 40, the tool spindle 100, or the tool rest 60.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2003-346249 filed on Oct. 3, 2003 and Japanese Patent Application No. 2004-219722 filed on Jul. 28, 2004 and including specification, claims, drawings and summary. The disclosures of the above Japanese Patent Applications are incorporated herein by reference in its entirety.

What is claimed is:

1. A lathe comprising:
   a main spindle which grips and rotates a work, and is reciprocatable in a Z direction which is parallel with an axis of rotation of said work;
   a back spindle which is positioned oppositely to said main spindle, grips and rotates a work, and is reciprocatable in the Z direction;
   a tool spindle which has an only one, exchangeably attached tool for machining said work, is reciprocatable in the Z direction and also reciprocatable in an X direction different from the Z direction, and rotates in an X-Z plane including the Z direction and the X direction to change a direction of said tool;
   a guide bush which rotatably supports said work projecting from said main spindle, and slides said work in a direction of axis of said work;
   a tool magazine which contains a plurality of tools; and
   a tool exchange mechanism which exchanges said tool which has been attached to said tool spindle, with another tool contained in said tool magazine, wherein
   said main spindle comprises a hole through which said work penetrates, so that said work can be gripped by said main spindle and can extend by penetrating through said hole, and
   said back spindle comprises a hole through which said work penetrates, so that said work can be gripped by said back spindle and can extend by penetrating through said hole.

2. The lathe according to claim 1, wherein said tool spindle is reciprocatable in the Z direction (Z2-axis direction) and the X direction (X1-axis direction), and is also reciprocatable in a Y direction which is different from the Z and X directions.

3. The lathe according to claim 1, comprising a tool rest which has one or a plurality of tools mounted thereon, and works independently from said tool spindle to machine said work gripped by said main spindle or by said back spindle by using said mounted tool.

4. The lathe according to claim 3, wherein said tool rest is movable in the X direction, the Z direction, and the Y direction.

5. The lathe according to claim 1, comprising a controller which controls positions of said main spindle and said back spindle and work gripping and work rotation by said spindles, and controls a position and direction of said tool spindle.

6. The lathe according to claim 1, wherein said main spindle and said back spindle can independently grip works respectively, and can grip one work in cooperation with each other.

* * * * *